(12) United States Patent
Endo

(10) Patent No.: US 12,202,299 B2
(45) Date of Patent: Jan. 21, 2025

(54) PNEUMATIC TIRE

(71) Applicant: The Yokohama Rubber Co., LTD., Tokyo (JP)

(72) Inventor: Toyoaki Endo, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 358 days.

(21) Appl. No.: 17/310,747

(22) PCT Filed: Feb. 21, 2020

(86) PCT No.: PCT/JP2020/007252
§ 371 (c)(1),
(2) Date: Aug. 20, 2021

(87) PCT Pub. No.: WO2020/171233
PCT Pub. Date: Aug. 27, 2020

(65) Prior Publication Data
US 2022/0105755 A1    Apr. 7, 2022

(30) Foreign Application Priority Data

Feb. 22, 2019  (JP) .................... 2019-030383
Apr. 1, 2019   (JP) .................... 2019-069804
(Continued)

(51) Int. Cl.
*B60C 11/12*     (2006.01)
*B60C 11/03*     (2006.01)
*B60C 11/13*     (2006.01)

(52) U.S. Cl.
CPC ....... *B60C 11/0306* (2013.01); *B60C 11/0311* (2013.01); *B60C 11/12* (2013.01);
(Continued)

(58) Field of Classification Search
CPC ............ B60C 11/0306; B60C 11/1236; B60C 11/1218; B60C 2011/0358;
(Continued)

(56) References Cited

U.S. PATENT DOCUMENTS 5,109,904 A    5/1992  Numata et al.
5,950,700 A    9/1999  Fukuoka
(Continued)

FOREIGN PATENT DOCUMENTS

CN    101903192 A    12/2010
CN    102958712 A     3/2013
(Continued)

OTHER PUBLICATIONS

Machine translation for Japan 2011-105135 (Year: 2023).*
(Continued)

*Primary Examiner* — Steven D Maki
(74) *Attorney, Agent, or Firm* — Thorpe North & Western

(57) ABSTRACT

A tread pattern of a pneumatic tire includes two or more circumferential main grooves in a half region demarcated by the equatorial plane, and land portions defined by the circumferential main grooves. A center land portion closest among the land portions to the equatorial plane includes a center sipe extending in the width direction, the center sipe is a composite sipe including a two-dimensional portion and three-dimensional portions provided on both sides of the two-dimensional portion in the width direction, a middle land portion that is adjacent to an outer side of the center land portion in the width direction includes a middle sipe extending in the width direction, and the middle sipe is a composite sipe comprising a two-dimensional portion provided on an inner side in the width direction and a three-dimensional portion provided on an outer side of the two-dimensional portion in the width direction.

15 Claims, 18 Drawing Sheets

(30) Foreign Application Priority Data

Jun. 19, 2019 (JP) .................................. 2019-113862
Jun. 19, 2019 (JP) .................................. 2019-114134

(52) U.S. Cl.
CPC ...... B60C 11/1204 (2013.01); B60C 11/1218 (2013.01); B60C 11/1236 (2013.01); B60C 11/1259 (2013.01); B60C 11/1263 (2013.01); B60C 11/1369 (2013.01); *B60C 2011/0341* (2013.01); *B60C 2011/0346* (2013.01); *B60C 2011/0358* (2013.01); *B60C 2011/0367* (2013.01); *B60C 2011/0388* (2013.01); *B60C 2011/1213* (2013.01); *B60C 2011/1227* (2013.01); *B60C 2011/1295* (2013.01); *B60C 2011/133* (2013.01); *B60C 2011/1338* (2013.01)

(58) Field of Classification Search
CPC ..... B60C 2011/0346; B60C 2011/1213; B60C 2011/1227; B60C 11/1369
See application file for complete search history.

(56) References Cited

U.S. PATENT DOCUMENTS

| | | | |
|---|---|---|---|
| 6,220,322 B1 | 4/2001 | Matsuura | |
| 6,382,283 B1 | 5/2002 | Caretta | |
| 6,415,834 B1 | 7/2002 | Carra et al. | |
| 2005/0016652 A1 | 1/2005 | Iwasaki | |
| 2009/0038723 A1* | 2/2009 | Thiebaud | B60C 11/1218 152/209.18 |
| 2010/0307651 A1* | 12/2010 | Castellini | B60C 11/12 152/209.21 |
| 2012/0267022 A1* | 10/2012 | Tagashira | B60C 11/0309 152/209.25 |
| 2013/0092304 A1 | 4/2013 | Murata | |
| 2013/0133799 A1 | 5/2013 | Furusawa et al. | |
| 2015/0041034 A1 | 2/2015 | Matsushita | |
| 2015/0151586 A1 | 6/2015 | Furusawa | |
| 2015/0191051 A1 | 7/2015 | Nagayasu et al. | |
| 2015/0251500 A1 | 9/2015 | Pokutta-Paskaleva et al. | |
| 2015/0321518 A1 | 11/2015 | Katayama et al. | |
| 2018/0178589 A1 | 6/2018 | Horiguchi et al. | |
| 2018/0264890 A1 | 9/2018 | Ueyama | |
| 2018/0272808 A1 | 9/2018 | Nishino | |

FOREIGN PATENT DOCUMENTS

| | | | |
|---|---|---|---|
| DE | 3013958 A | | 4/1980 |
| DE | 698 02 275 T2 | | 7/2002 |
| DE | 112016000438 T5 | | 10/2017 |
| JP | S62-184903 A | | 8/1987 |
| JP | H07-215013 A | | 8/1995 |
| JP | H07-290908 A | | 11/1995 |
| JP | H11-20412 A | | 1/1999 |
| JP | H11-151914 A | | 6/1999 |
| JP | H11-342708 A | | 12/1999 |
| JP | 2000-255219 A | | 9/2000 |
| JP | 2002-046426 A | * | 2/2002 |
| JP | 2003-165311 A | * | 6/2003 |
| JP | 2006-035933 A | | 2/2006 |
| JP | 2006-82632 A | | 3/2006 |
| JP | 2007-22361 A | | 2/2007 |
| JP | 2011-507749 A | | 3/2011 |
| JP | 2011-105135 A | * | 6/2011 |
| JP | 2012-236455 A | | 12/2012 |
| JP | 2013-216271 A | | 10/2013 |
| JP | 2013-252690 A | | 12/2013 |
| JP | 2013-252749 A | | 12/2013 |
| JP | 2014-129008 A1 | | 7/2014 |
| JP | 2014-172484 A | | 9/2014 |
| JP | 2015-209169 A | | 11/2015 |
| JP | 2015-212146 A | | 11/2015 |
| JP | 2016-41588 A | | 3/2016 |
| JP | 5948995 B | | 6/2016 |
| JP | 2016-132441 A | | 7/2016 |
| JP | 2017-043208 A | | 3/2017 |
| JP | 2017-52345 A | | 3/2017 |
| JP | 2017-52347 A | | 3/2017 |
| JP | 2017-128253 A | | 7/2017 |
| JP | 2018-1976 A | | 1/2018 |
| JP | 2018-20735 A | | 2/2018 |
| JP | 2018-199459 A | | 12/2018 |
| KR | 10-1357513 B1 | | 2/2014 |
| WO | WO 98/31555 A1 | | 7/1998 |
| WO | 2013/136947 A1 | | 9/2013 |
| WO | 2014/084320 A1 | | 6/2014 |
| WO | 2014/092078 A1 | | 6/2014 |
| WO | 2016/056597 A1 | | 4/2016 |
| WO | 2017/137903 A1 | | 8/2017 |

OTHER PUBLICATIONS

Machine translation for Japan 2003-165311 (Year: 2023).*
Machine transition for Japan 2002-046426 (Year: 2023).*
Notice of Reasons For Refusal for JP 2019030383 dated May 19, 2020.
Decision to Grant a Patent for JP 2019030383 dated Jun. 22, 2021.
Notice of Reasons For Refusal for JP 2019069804 dated May 19, 2020.
Notice of Reasons For Refusal for JP 2019113862 dated Apr. 14, 2020.
Decision to Grant a Patent for JP 2019114134 dated Apr. 28, 2020.

* cited by examiner

PNEUMATIC TIRE

TECHNICAL FIELD

The present technology relates to a pneumatic tire.

BACKGROUND ART

Japan Unexamined Patent Publication No. 2017-43208 describes a pneumatic tire that is designed to provide drainage performance and uneven wear resistance performance in a compatible manner. In Japan Unexamined Patent Publication No. 2017-43208, a recess portion is provided in the groove wall of the main groove, and a sipe communicating with the recess portion and a shallow groove communicating with the other portion than the recess portion are provided. Japan Patent No. 5948995 also describes a pneumatic tire that can provide on-snow performance and uneven wear resistance performance in a compatible manner. In Japan Patent No. 5948995, the sipe density on a vehicle inner side is increased and a large number of three-dimensional sipes are disposed on the vehicle inner side, designed to provide snow performance and uneven wear resistance performance in a compatible manner.

In the pneumatic tires of Japan Unexamined Patent Publication No. 2017-43208 described above, the improvement of braking performance on snow-covered road surfaces, in other words, braking on snow performance, as well as steering stability performance on snow-covered road surfaces, in other words, handling on snow performance has not been considered, and there is room for improvement. Also, in the pneumatic tires of Japan Patent No. 5948995 described above, there is room for improvement of pattern noise performance.

SUMMARY

The present technology provides a pneumatic tire having improved the uneven wear resistance performance, braking on snow performance, handling on snow performance, and pattern noise performance in a well-balanced manner.

A pneumatic tire according to an aspect of the present technology is a pneumatic tire including a tread pattern, the tread pattern including two or more circumferential main grooves provided in a half region demarcated by a tire equatorial plane, and a plurality of land portions defined by the circumferential main grooves, a center land portion that is the closest land portion of the plurality of land portions to the tire equatorial plane including a center sipe extending in a tire width direction, the center sipe being a composite sipe including a two-dimensional portion and three-dimensional portions provided on both sides of the two-dimensional portion in the tire width direction, a middle land portion that is a land portion adjacent to an outer side of the center land portion in the tire width direction including a middle sipe extending in the tire width direction, and the middle sipe being a composite sipe including a two-dimensional portion provided on an inner side in the tire width direction and a three-dimensional portion provided on an outer side of the two-dimensional portion in the tire width direction.

A ratio of a total length of the three-dimensional portions of the center sipe in the tire width direction to a length of the center sipe in the tire width direction is preferably 0.30 or more and 0.70 or less.

The center sipe preferably has a Z-shape with two bent portions.

A ratio of a length of the three-dimensional portion of the middle sipe in the tire width direction to a length of the middle land portion in the tire width direction is preferably 0.25 or more and 0.80 or less.

The middle sipe has a Z-shape with two bent portions, and a ratio of a distance in the tire width direction between a bent portion that is a closer of the two bent portions to a center line, the center line passing through a midpoint position of the land portion in the tire width direction, and the center line to a width of the land portion in the tire width direction is preferably 0 or more and 0.40 or less.

An edge on an outer side of the middle land portion in the tire width direction is a zigzag edge having a zigzag shape with recesses/protrusions that has a position periodically changing in the tire width direction, an edge on an inner side of the middle land portion in the tire width direction has a straight shape, and the three-dimensional portion of the middle sipe is preferably connected to the zigzag edge.

The middle sipe is preferably connected to a maximum amplitude position of the zigzag edge in the tire width direction.

A ratio of a minimum value of distances between protrusion portions of the zigzag shape to a maximum value of the distances between the protrusion portions of the zigzag shape is preferably 0.50 or more.

The middle land portion preferably includes a plurality of lug grooves and, between the lug grooves that are adjacent, two or more of the middle sipes and three or more protrusion portions of the zigzag shape.

Distances in the tire circumferential direction between connection portions of the two or more middle sipes with the circumferential main groove on the inner side in the tire width direction, the two or more middle sipes provided between the lug grooves that are adjacent, are Ls1, Ls2, . . . , Lsn, where n is a natural number of three or greater, and preferably, Ls1<Lsn.

Distances in the tire circumferential direction between connection portions of the two or more middle sipes with a circumferential main groove on the inner side in the tire width direction, the two or more middle sipes provided between the lug grooves that are adjacent, are Ls1, Ls2, . . . , Lsn, where n is a natural number of three or greater, distances in the tire circumferential direction between the protrusion portions of connection portions of a plurality of the middle sipes with the circumferential main groove on an outer side in the tire width direction, the plurality of middle sipes provided between the lug grooves that are adjacent, are Lz1, Lz2, . . . , Lzn, where n is a natural number of three or greater, and preferably, Ls1<Lz1 and Lsn>Lzn.

The pneumatic tire further including a shoulder land portion that is a land portion on an outer side of the middle land portion in the tire width direction, wherein the shoulder land portion includes a shoulder sipe extending in the tire width direction, the shoulder sipe is preferably a composite sipe including a three-dimensional portion provided on the inner side in the tire width direction and a two-dimensional portion provided on an outer side of the three-dimensional portion in the tire width direction.

A ratio of a length of the three-dimensional portion of the shoulder sipe in the tire width direction to a ground contact width of the shoulder land portion in the tire width direction is preferably 0.25 or more and 0.65 or less.

Groove wall surfaces of both sides of the circumferential main groove between the middle land portion and the shoulder land portion are preferably wall surfaces in which zigzag edges face each other.

According to embodiments of the present technology, an effect of improving the uneven wear resistance performance, braking on snow performance, handling on snow performance, and pattern noise performance in a well-balanced manner is achieved.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiments. Constituents of the embodiments include elements that are substantially identical or that can be substituted and easily conceived by one skilled in the art. The plurality of modified examples described in the embodiments can be combined as desired within the scope apparent to one skilled in the art. Moreover, various omissions, substitutions, and changes to the configurations can be carried out within the scope of the present technology.

Pneumatic Tire

Figure 1:
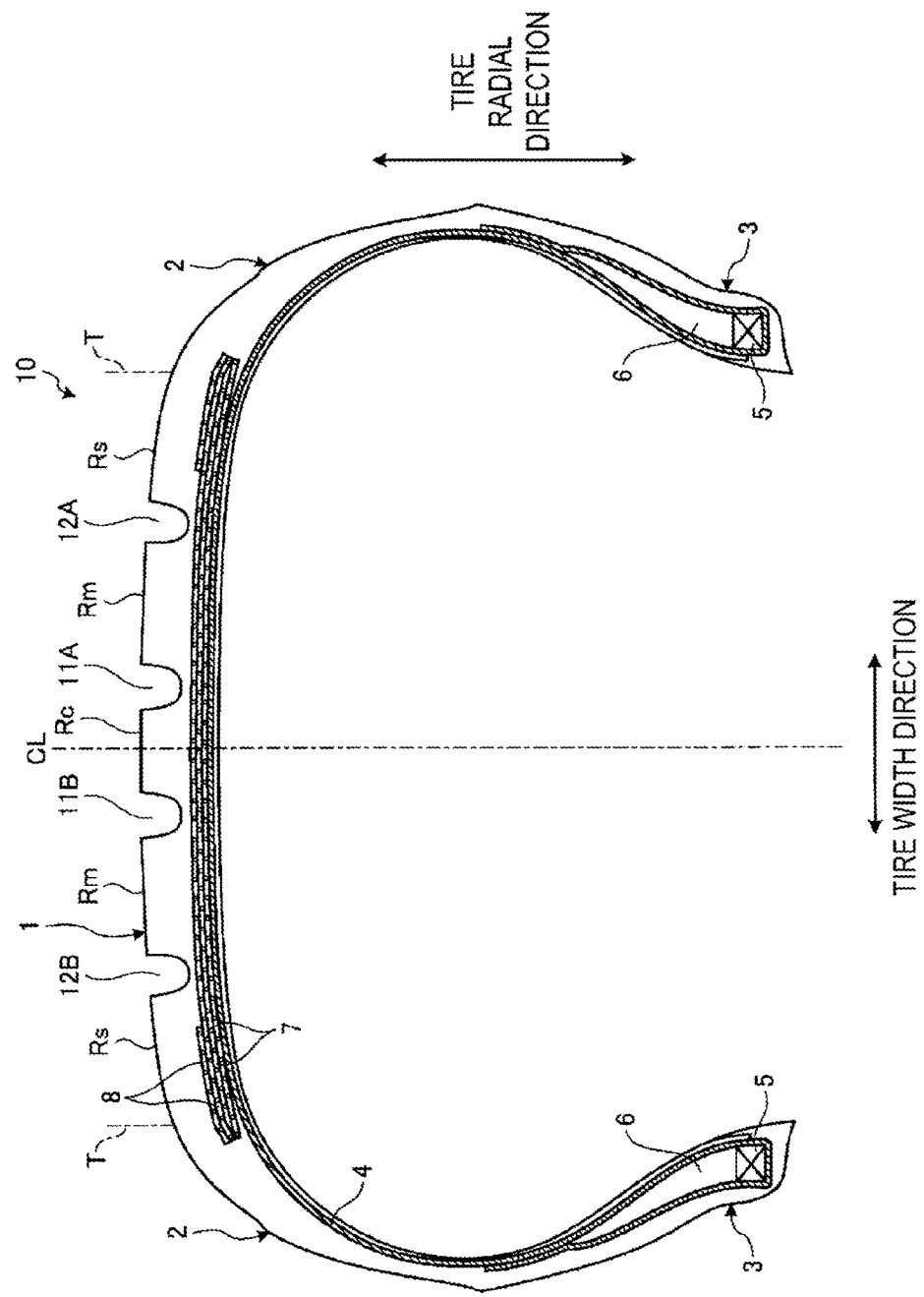
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. FIG. 1 is a cross-sectional view of a half region in a tire radial direction. Additionally, FIG. 1 illustrates a radial tire for a passenger vehicle as an example of a pneumatic tire.

"Cross-section in the tire meridian direction" refers to a cross section of the tire taken along a plane that includes the tire rotation axis (not illustrated). A reference sign CL denotes a tire equatorial plane and refers to a plane perpendicular to the tire rotation axis that passes through the center point of the tire in a tire rotation axis direction. "Tire radial direction" refers to the direction orthogonal to the rotation axis (not illustrated) of a pneumatic tire 10, "inner side in the tire radial direction" refers to the side toward the rotation axis in the tire radial direction, "outer side in the tire radial direction" refers to the side away from the rotation axis in the tire radial direction. In addition, "tire circumferential direction" refers to the circumferential direction with the rotation axis as the center axis. In addition, "tire width direction" refers to a direction parallel with the tire rotation axis. "Inner side in the tire width direction" refers to the side toward the tire equatorial plane CL in the tire width direction, and "outer side in the tire width direction" refers to the side away from the tire equatorial plane CL in the tire width direction.

"Tire equatorial plane CL" refers to a plane orthogonal to the rotation axis of the pneumatic tire 10 that passes through the center of the tire width of the pneumatic tire 10. "Tire width" is the width in the tire width direction between components located on outer sides in the tire width direction, or in other words, the distance between the components that are the most distant from the tire equatorial plane CL in the tire width direction. "Tire equator line" refers to a line along the tire circumferential direction of the pneumatic tire 10 that lies on the tire equatorial plane CL. In the present embodiment, the tire equator line and the tire equatorial plane are denoted by the same reference sign CL.

As illustrated in FIG. 1, the pneumatic tire 10 according to the present embodiment includes an annular tread portion 1 extending in the tire circumferential direction, a pair of sidewall portions 2, 2 disposed on both sides of the tread portion 1, and a pair of bead portions 3, 3 disposed on the inner side in the tire radial direction of the pair of sidewall portions 2.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5.

On the other hand, a plurality of belt layers 7 are embedded on the outer circumferential side of the carcass layer 4 in the tread portion 1. Each of the belt layers 7 includes a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall within a range of from 10° to 40°, for example. Steel cords are preferably used as the reinforcing cords of the belt layers 7. To improve high-speed durability, at least one belt cover layer 8, formed by disposing reinforcing cords at an angle of, for example, not greater than 5° with respect to the tire circumferential direction, is disposed on an outer circumferential side of the belt layers 7. Organic fiber cords such as nylon and aramid are preferably used as the reinforcing cords of the belt cover layer 8.

Note that the tire internal structure described above represents a typical example for a pneumatic tire, and the pneumatic tire is not limited thereto.

Tread Portion

Figure 2:
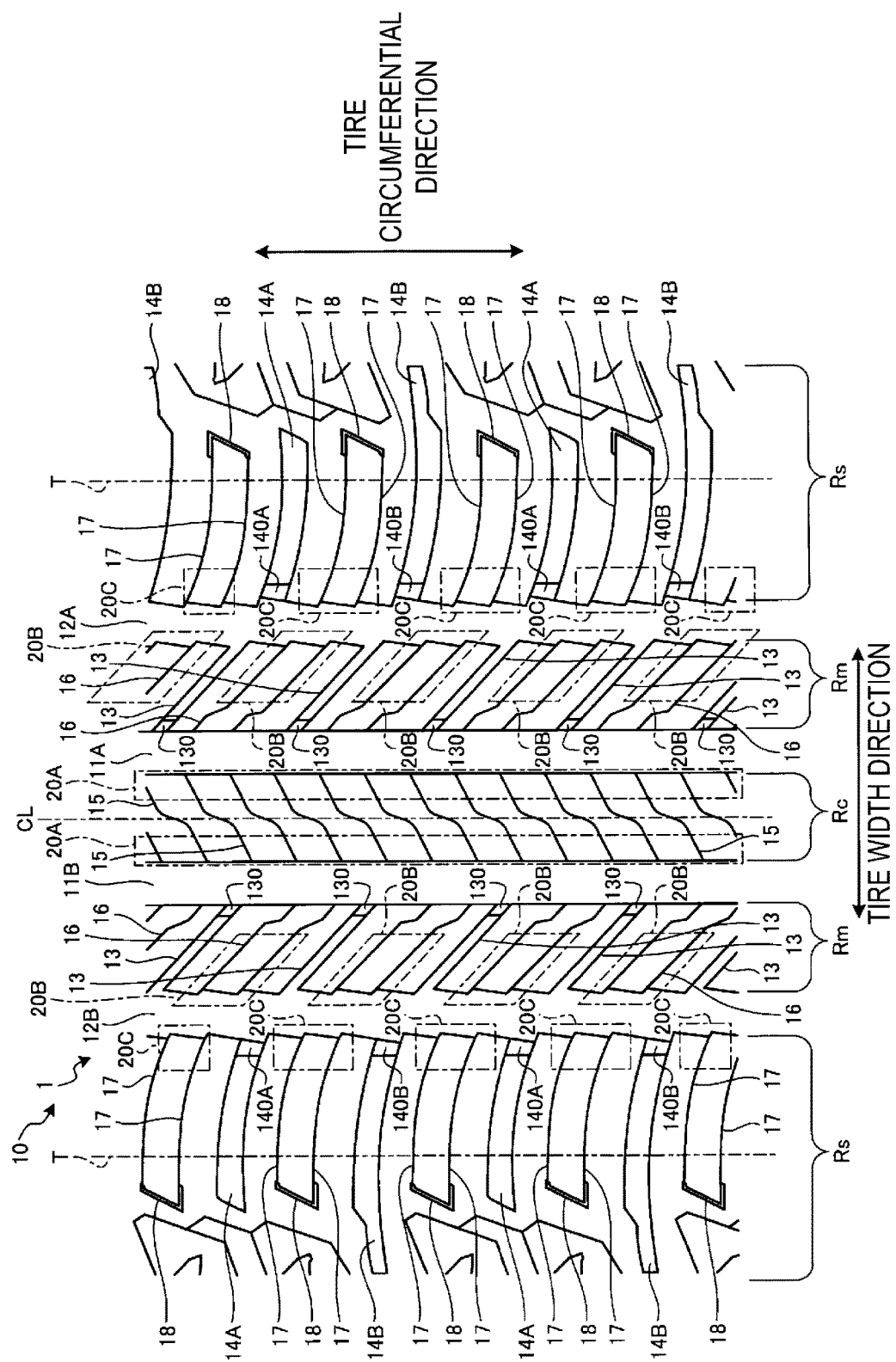
FIG. 2 is a developed view illustrating an example of a tread pattern of the pneumatic tire illustrated in FIG. 1.

FIG. 2 is a developed view illustrating an example of a tread pattern of the pneumatic tire 10 illustrated in FIG. 1. The reference sign T denotes a tire ground contact edge in FIGS. 1 and 2.

As illustrated in FIG. 2, the pneumatic tire 10 of the present example includes four circumferential main grooves 11A, 11B, 12A, and 12B in the tread portion 1. The circumferential main grooves 12A and 12B extend in the tire circumferential direction at positions on an outer side of the tire equatorial plane CL in the tire width direction. The circumferential main groove 11A extends in the tire circumferential direction at a position closer to the tire equatorial plane CL than the circumferential main groove 12A. The circumferential main groove 11B extends in the tire circumferential direction at a position closer to the tire equatorial plane CL than the circumferential main groove 12B.

The circumferential main grooves 11A, 11B, 12A, and 12B are circumferential grooves with a wear indicator that indicates the terminal stage of wear and typically have a groove width of 5.0 mm or more and a groove depth of 7.5 mm or more. Note that the groove widths and groove depths of the circumferential main grooves 11A, 11B, 12A, and 12B are not limited to the ranges described above.

Moreover, "lug groove" refers to a lateral groove having a groove width of 2.0 mm or more and a groove depth of 3.0 mm or more. Additionally, "sipe", which is described below, refers to a cut formed in a land portion that typically has a groove width of less than 1.5 mm.

In FIG. 2, a center land portion Rc is defined by the two circumferential main grooves 11A and 11B. In addition, one middle land portion Rm is defined by the two circumferential main grooves 11A and 12A, and the other middle land portion Rm is defined by the two circumferential main grooves 11B and 12B. One shoulder land portion Rs is on an outer side of the circumferential main groove 12A in the tire width direction. The other shoulder land portion Rs is on an outer side of the circumferential main groove 12B in the tire width direction. Note that when three circumferential main grooves are provided, no center land portion Rc is provided, and the tread portion includes: the middle land portions Rm on both sides of the equator line CL; and the shoulder land portions Rs each on an outer side of the middle land portions Rm in the tire width direction.

The center land portion Rc (hereinafter, also referred to simply as the land portion Rc) is located on the tire equator line CL. The land portion Rc includes a plurality of sipes 15. The sipes 15 extend in the tire circumferential direction and the tire width direction. One end of the sipe 15 is connected to the circumferential main groove 11A, and the other end of the sipe 15 is connected to the circumferential main groove 11B. The sipe 15 is a through sipe extending through the land portion Rc. Note that in the present example, the edges on both sides of the land portion Rc have straight shapes.

The middle land portion Rm (hereinafter, also simply referred to as the land portion Rm) has a plurality of lug grooves 13. The lug grooves 13 extend in the tire width direction and the tire circumferential direction. One end on an inner side of the lug groove 13 in the tire width direction opens to the circumferential main groove 11A or 11B. The other end on an outer side of the lug groove 13 in the tire width direction opens to the circumferential main groove 12A or 12B. The land portion Rm has a raised bottom portion 130 in the lug groove 13. The raised bottom portion 130 is a portion where the groove bottom of the lug groove 13 is raised so that the groove depth is shallower than other portions. The raised bottom portion 130 is provided on an end portion on the inner side of the lug groove 13 in the tire width direction. The land portion Rm also includes a plurality of sipes 16 between the adjacent lug grooves 13. The sipes (hereinafter, also referred to as "middle sipe") 16 extend in the tire circumferential direction and the tire width direction. One end of the sipe 16 is connected to the circumferential main groove 11A or 11B, and the other end of the sipe 16 is connected to the circumferential main groove 12A or 12B. The sipe 16 is a through sipe extending through the land portion Rm.

In the present example, an edge on an outer side of the land portion Rm in the tire width direction, in other words, an edge on the circumferential main groove 12A or 12B side, has a zigzag shape (hereinafter may be referred to as a zigzag edge). The zigzag shape is a shape with recesses/protrusions that has a position periodically changing in the tire width direction. An edge on an inner side of the land portion Rm in the tire width direction, in other words, an edge on the circumferential main groove 11A or 11B side, has a straight shape that does not have recess/protrusion.

The shoulder land portion Rs (hereinafter, also simply referred to as the land portion Rs) has a plurality of lug grooves 14A, 14B. The lug grooves 14A, 14B extend in the tire width direction from the inner side in the tire width direction toward the outer side in the tire width direction. The lug grooves 14A, 14B extend from the circumferential main grooves 12A or 12B to positions on an outer side of the tire ground contact edge T. The land portion Rs has a plurality of sipes 17 between the lug groove 14A and the lug groove 14B. The sipes 17 extend in the tire width direction. One end of the sipe 17 is connected to the circumferential main groove 12A or 12B, and the other end of the sipe 17 is connected to a decorative groove 18 on the outer side of the tire ground contact edge T.

In the present example, the land portion Rs has raised bottom portions 140A, 140B in the lug grooves 14A, 14B. The raised bottom portions 140A, 140B are portions where the groove bottom of the lug grooves 14A, 14B are raised so that the groove depth is shallower than other portions. The raised bottom portions 140A, 140B are provided at the end portions on an inner side of the lug grooves 14A, 14B in the tire width direction, in other words, at open ends of the circumferential main grooves 12A, 12B.

Sipe

In FIG. 2, the sipes 15, 16, and 17 are composite sipes each having a section of two-dimensional portion (so-called planar sipe) and a section of three-dimensional portion (so-called 3D sipe). "Two-dimensional portion" refers to a portion having a sipe wall surface having a linear shape when viewed in a cross-sectional view perpendicular to the length direction of the sipe. "Three-dimensional portion" refers to a portion having a sipe wall surface having a shape bent in a sipe width direction when viewed in a cross-sectional view perpendicular to the length direction of the sipe. The sipes 15, 16, and 17 ensure the edge components of the land portions Rc, Rm, and Rs, and the traction characteristics of the pneumatic tire 10 is improved.

In FIG. 2, a section of the sipe 15 in a region 20A is a three-dimensional portion. A section of the sipe 15 other than the region 20A is a two-dimensional portion. A section of the sipe 16 in a region 20B is a three-dimensional portion. A section of the sipe 16 other than the region 20B is a two-dimensional portion. A section of the sipe 17 in a region 20C is a three-dimensional portion. A section of the sipe 17 other than the region 20C is a two-dimensional portion.

The two-dimensional portion has a sipe wall surface having a straight shape in any cross-sectional view (cross-sectional view including the sipe width direction and a sipe depth direction), where a sipe length direction is the normal direction. The three-dimensional portion has a sipe wall surface having a bent shape with an amplitude in the sipe width direction in both a cross-sectional view in which the sipe length direction is a normal direction and a cross-sectional view in which the sipe depth direction is a normal direction. The three-dimensional portion has an effect of reinforcing the rigidity of the land portion because the meshing force of the opposing sipe wall surfaces is stronger than the two-dimensional portions. By increasing the rigidity of the zigzag shaped portion of the land portion, the tire chip resistance performance can be improved.

Here, focusing on the land portion Rm defined by the circumferential main groove 11A and the circumferential main groove 12A, the edge on the circumferential main groove 12A side has a zigzag shape. In other words, one of the edges of the land portion Rm in the tire width direction has a zigzag shape. In addition, the region 20B is on the edge side that has a zigzag shape. In other words, the three-dimensional portion of the sipe 16 is connected to an edge that has a zigzag shape, in other words, a zigzag edge. As a result, the land portion Rm improves snow performance due to the edge effect of the zigzag shape. Furthermore, because the sipe 16 in the portion connected to the circumferential main groove 12A on the edge side having a zigzag shape is a three-dimensional portion, the block rigidity of the portion of the zigzag shape increases, and the tire chip resistance performance is improved.

In addition, focusing on the land portion Rs, an edge on the circumferential main groove 12A side has a zigzag shape. In other words, one of the edges of the land portion Rs in the tire width direction has a zigzag shape. In addition, the region 20C is on the edge side that has a zigzag shape. In other words, the three-dimensional portion of the sipe 17 is connected to an edge that has a zigzag shape, in other words, a zigzag edge. As a result, the land portion Rs improves snow performance due to the edge effect of the zigzag shape. Furthermore, because the sipe 17 in the portion connected to the circumferential main groove 12A on the edge side having a zigzag shape is a three-dimensional portion, the block rigidity of the portion of the zigzag shape increases, and the tire chip resistance performance is improved.

Focusing on the circumferential main groove 12A between the land portion Rm and the land portion Rs, the groove wall surfaces on both sides of the circumferential main groove 12A are wall surfaces in which the zigzag edges face each other. This increases the edge effect and improves snow performance.

Also, focusing on the land portion Rs, a three-dimensional portion is disposed at one end of the sipe 17 that connects to the circumferential main groove 12A or 12B between the land portion Rs and the land portion Rm, and a two-dimensional portion is disposed on the other end of the sipe 17. By disposing in this manner, degradation of pattern noise due to an increase in block rigidity can be suppressed while improving the uneven wear resistance performance of the land portion Rm.

Figure 3:
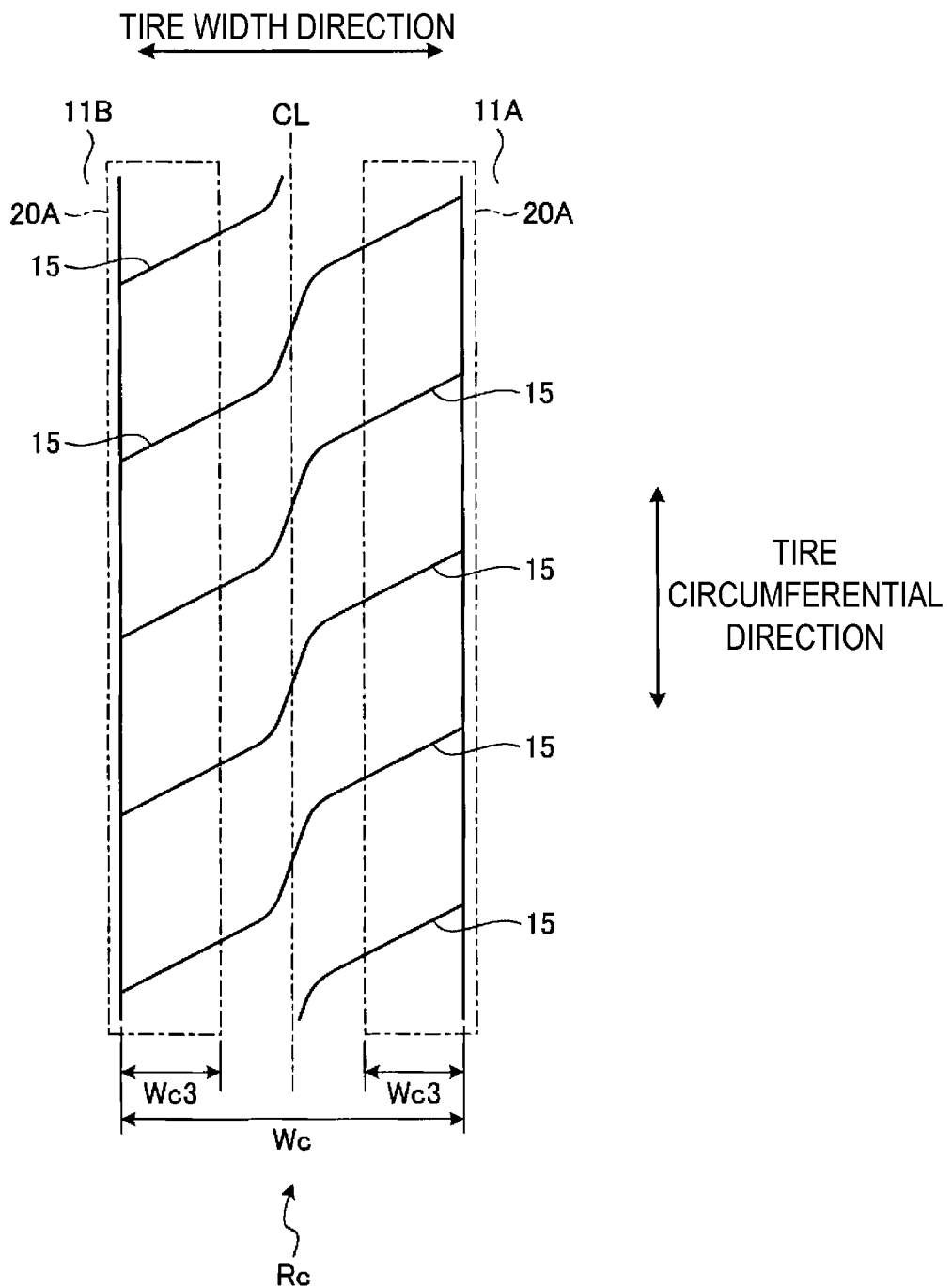
FIG. 3 is an enlarged view of a part of a center land portion of the tread pattern illustrated in FIG. 2.

FIG. 3 is an enlarged view of a part of the center land portion Rc of the tread pattern illustrated in FIG. 2. In FIG. 3, the sipe 15 of the land portion Rc (hereinafter, also referred to as a center sipe) has a section of a two-dimensional portion that transverses the tire equatorial plane CL and a section of the region 20A of three-dimensional portion provided on both sides of the section of the two-dimensional portion in the tire width direction. Note that in FIG. 3, the land portion Rc does not include lug grooves.

Here, a maximum width of the land portion Rc in the tire width direction is denoted as Wc, and a length of the region 20A of three-dimensional portion in the tire width direction is denoted as Wc3. In this case, a ratio Wc3/Wc is preferably 0.30 or more and 0.70 or less. When the ratio Wc3/Wc is less than 0.30, sufficient block rigidity will not be obtained, and wear resistance performance decreases, which is not preferable. When the ratio Wc3/Wc is greater than 0.70, block rigidity on the three-dimensional portion side will be too high, and pattern noise will be negatively affected, which is not preferable.

The center sipe 15 has a generally Z-shape with two bent portions. A generally Z-shape of the center sipe 15 is provided in the two-dimensional portion. Because the center sipe 15 has a generally Z-shape, the edge effect is increased, and the snow performance is improved.

The center sipe 15 is a composite sipe having a two-dimensional portion and three-dimensional portions provided on both sides of the two-dimensional portion. Thus, the three-dimensional portion of the center sipe 15 and the two-dimensional portion of the middle land portion Rm are disposed so as to face each other. As a result, excessive reduction in block rigidity at or near the circumferential main grooves 11A, 11B on the tire equatorial plane CL side is suppressed, and the uneven wear resistance performance at or near the tire equatorial plane CL can be improved.

Middle Land Portion

Figure 4:
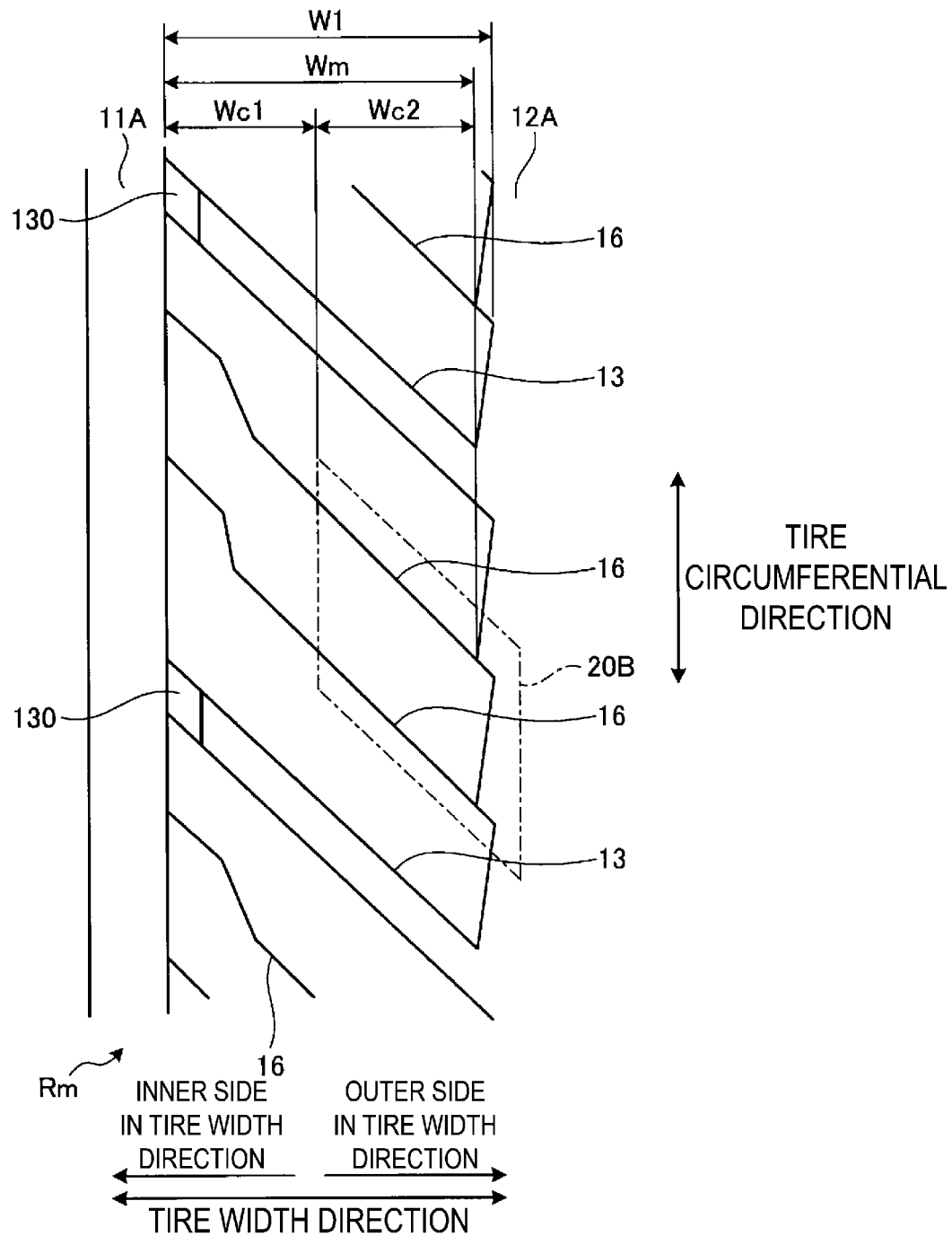
FIG. 4 is an enlarged view of a part of a middle land portion of the tread pattern illustrated in FIG. 2.

FIG. 4 is an enlarged view of a part of the middle land portion Rm of the tread pattern illustrated in FIG. 2. In FIG. 4, a maximum width of the land portion Rm in the tire width direction is denoted as W1. Also, in FIG. 4, a distance (length) in the tire width direction from a connection portion of the sipe 16 with the circumferential main groove 11A to an edge on an inner side of the region 20B in the tire width direction, which is a section of the two-dimensional portion, is denoted as Wc1. The distance Wc1 is the length of the two-dimensional portion of the sipe 16 in the tire width direction. In FIG. 4, a distance from a connection portion of the sipe 16 with the circumferential main groove 12A to an edge on the inner side of the region 20B in the tire width direction, which is a section of the three-dimensional portion, is denoted as Wc2. Here, a length that is a sum of the length Wc1 and the length Wc2 is denoted as Wm. The length Wm is a length of the entire sipe 16 in the tire width direction. In this case, a ratio Wc2/Wm is preferably 0.25 or more and 0.80 or less. When the ratio Wc2/Wm is less than 0.25, sufficient block rigidity will not be obtained, and steering stability performance will be negatively affected, which is not preferable. When the ratio Wc2/Wm is greater than 0.80, block rigidity will be too high, and pattern noise will be negatively affected, which is not preferable.

Also, a ratio Wc1/Wm is preferably 0.20 or more and 0.70 or less. When the ratio Wc1/Wm is less than 0.20, the block rigidity of the sipe 16 on the circumferential main groove 11A side will be too high, which is not preferable. When the ratio Wc1/Wm is greater than 0.70, the block rigidity of the sipe 16 on the circumferential main groove 11A side will be too low, which is not preferable.

Z-Shape

Figure 5:
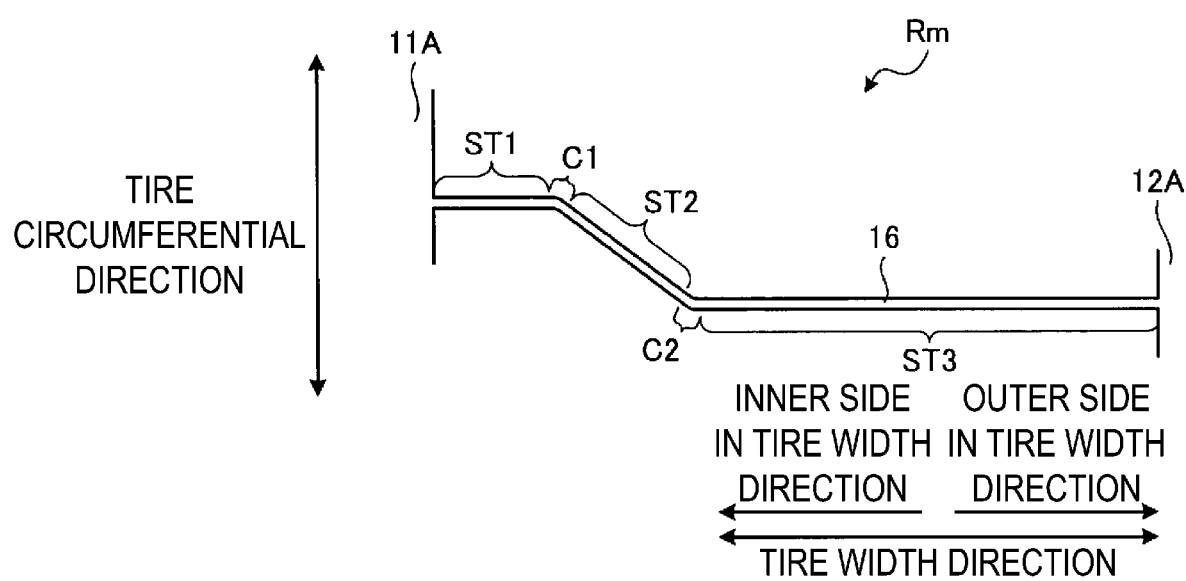
FIG. 5 is a plan view illustrating an example of a sipe.

FIG. 5 is a plan view illustrating an example of the sipe 16. In FIG. 5, one end of the sipe 16 is connected to the circumferential main groove 11A, and the other end is connected to the circumferential main groove 12A. With reference to FIG. 5, the sipe 16 of the present example includes linear portions ST1, ST2, and ST3, and bent portions C1 and C2. The linear portion ST1 is disposed on the circumferential main groove 11A side, in other words, on the inner side in the tire width direction. The linear portion ST1 is connected to the edge on the inner side of the land portion Rm in the tire width direction. The linear portion ST3 is disposed on the circumferential main groove 12A side, in other words, on the outer side in the tire width direction. The linear portion ST3 is connected to the edge on the outer side of the land portion Rm in the tire width direction. A length of the linear portion ST1 in the extension direction is shorter than a length of the linear portion ST3 in the extension direction.

One end of the linear portion ST1 is connected to the circumferential main groove 11A, and the other end of the linear portion ST1 is connected to one end of the bent portion C1. The other end of the bent portion C1 is connected to the linear portion ST2. One end of the linear portion ST3 is connected to the circumferential main groove 12A, and the other end of the linear portion ST3 is connected to one end of the bent portion C2. The other end of the bent portion C2 is connected to the linear portion ST2. In this way, the bent portion C1 is provided between the linear portion ST1 and the linear portion ST2 and the bent portion C2 is provided between the linear portion ST2 and the linear portion ST3, and thus the sipe 16 has a generally Z-shape. The Z-shape is a shape including at least two bent portions and having the linear portions connected to each other by the bent portions. Note that the Z-shape may include an S-shape formed of an arc. Hereinafter, of the linear portion ST1 and the linear portion ST3, the linear portion ST1 that is closer to the equatorial plane CL may be referred to as an inner side linear portion, and the linear portion ST3 that is further from the equatorial plane CL may be referred to as an outer side linear portion.

Figure 6:
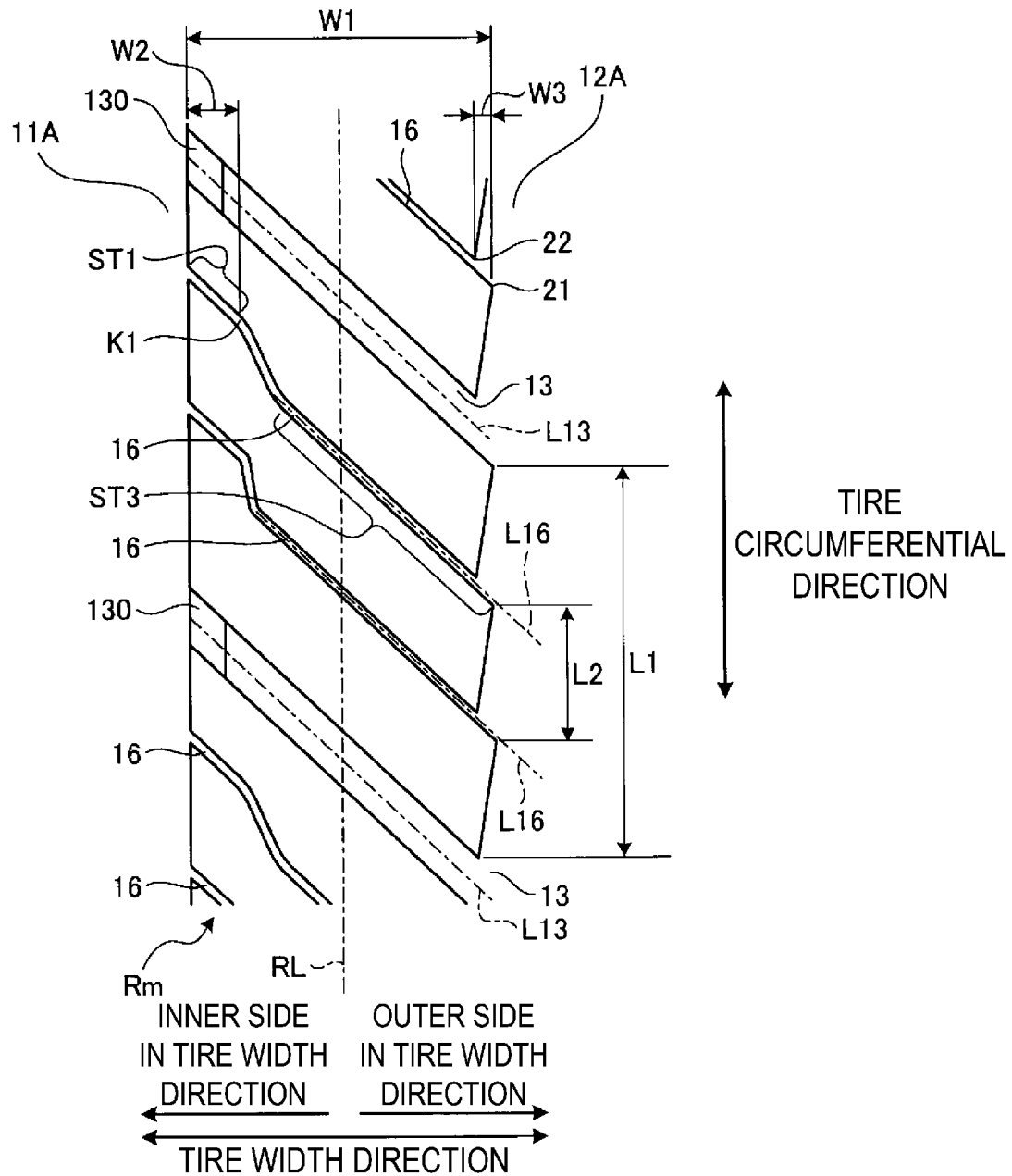
FIG. 6 is an enlarged view of a part of a middle land portion of the tread pattern illustrated in FIG. 2.

FIG. 6 is an enlarged view of a part of the middle land portion Rm of the tread pattern illustrated in FIG. 2. In FIG. 6, in a block defined by the adjacent lug grooves 13 of the plurality of lug grooves 13 extending through the land portion Rm, a length of the edge of the zigzag shape between the adjacent lug grooves 13 in the tire circumferential direction is denoted as L1. A distance between protrusion portions of the zigzag shape in the tire circumferential direction is denoted as L2. A ratio L2/L1 of the distance L2 to the length L1 is preferably 0.15 or more and 0.55 or less. When the ratio L2/L1 is greater than 0.55, the edge effect cannot be sufficiently achieved, and the snow performance does not improve, which is not preferable. When the ratio L2/L1 is less than 0.15, recesses/protrusions of the zigzag shape are excessively fine and chip easily, which is not preferable. Note that the length L1 of the edge of the zigzag shape in the tire circumferential direction is measured with reference to the corner portions that are the intersection points of the lug grooves 13 and the circumferential main groove 12A.

Also, in FIG. 6, a maximum width of the land portion Rm in the tire width direction is denoted as W1. A length (in other words, a width) in the tire width direction from a connection point of the sipe 16 with the circumferential main groove 11A on the inner side in the tire width direction to an end point K1 on the outer side of the inner side linear portion ST1 in the tire width direction is denoted as W2. In a block defined by the adjacent lug grooves 13 of the plurality of lug grooves 13 extending through the land portion Rm, a width that is two-times an amplitude of the zigzag shape in the tire width direction is denoted as W3. The width W3 is a distance in the tire width direction between a corner portion 21 and a corner portion 22 at an opening of the sipe 16.

In this case, a ratio W2/W1 of the width W2 to the width W1 is preferably 0.10 or more and 0.40 or less. When the ratio W2/W1 is less than 0.10, the edge effect is reduced, and the snow performance is degraded, which is not preferable. When the ratio W2/W1 is greater than 0.40, the bent portion C1 is close to the zigzag portion, and the tire chip resistance performance is poor, which is not preferable.

A ratio W3/W2 of the width W3 to the width W2 is preferably 0.15 or more and 0.45 or less. When the ratio W3/W2 is less than 0.15, the edge effect of the zigzag groove is reduced, and the snow performance is degraded, which is not preferable. When the ratio W3/W2 is greater than 0.45, drainage properties are degraded, and the edge effect of the sipes 16 is also reduced, and thus the snow performance is degraded, which is not preferable.

Additionally, a ratio W3/W1 of the width W3 to the maximum width W1 of the land portion Rm in the tire width direction is preferably 0.03 or more and 0.15 or less. When the ratio W3/W1 is greater than 0.15, drainage properties are impaired, and drainage performance is degraded, which is not preferable. When the ratio W3/W1 is less than 0.03, the edge effect is not achieved and the snow performance does not improve, which is not preferable.

Incidentally, in the land portion Rm, preferably, two or more of the sipes 16 are provided between the adjacent lug grooves 13, and three or more protrusion portions of the zigzag shape are provided between the adjacent lug grooves 13. When there are less than two sipes 16 between the adjacent lug grooves 13, the number of the protrusion portions of the zigzag shape is reduced and snow performance does not improve, which is not preferable.

Additionally, in FIG. 6, the respective linear portions ST3 of the plurality of sipes 16 are parallel to each other. Here, "parallel" means that an angle formed by two straight lines L16 that extend the respective center lines of the two sipes 16 is within ±5°. When the two straight lines L16 are completely parallel, the angle formed by the two straight lines L16 is 0°.

Furthermore, in FIG. 6, the plurality of lug grooves 13 are parallel to each other. Here, "parallel" means that an angle formed by two straight lines L13 that extend the respective center lines of the two lug grooves 13 is within ±5°. When the two straight lines L13 are completely parallel, the angle formed by the two straight lines L13 is 0°.

Figure 7:
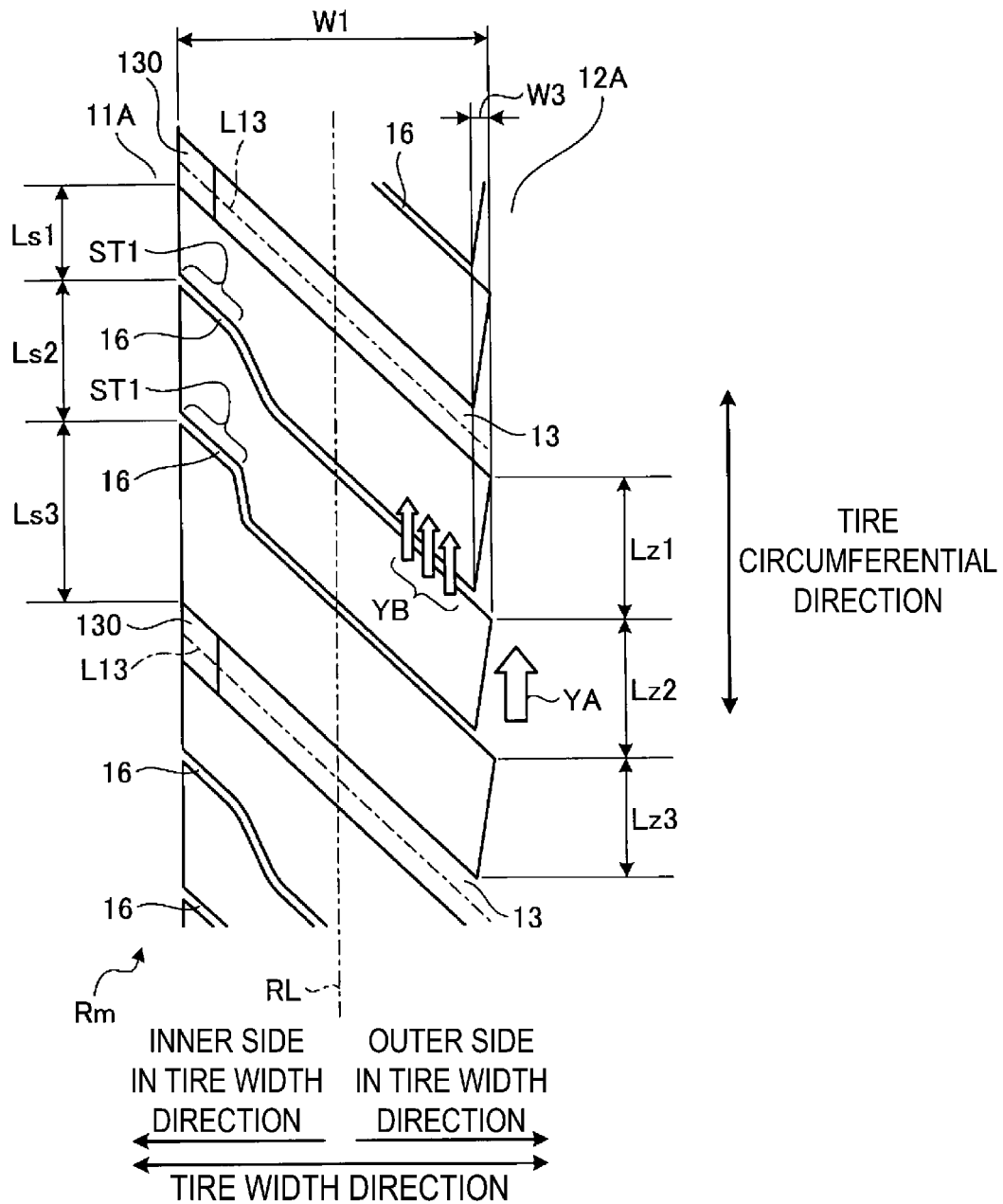
FIG. 7 is an enlarged view of a part of a middle land portion of the tread pattern illustrated in FIG. 2.

FIG. 7 is an enlarged view of a part of the middle land portion Rm of the tread pattern illustrated in FIG. 2. In FIG. 7, distances between protrusion portions of the zigzag shape between the adjacent lug grooves 13 are each denoted as Lz1, Lz2, . . . , Lzn, where n is a natural number of three or greater. The distance Lz1 and the distance Lzn are distances in the tire circumferential direction measured with reference to the lug grooves 13 that are different from each other. In this case, a ratio Lzmin/Lzmax of the shortest distance Lzmin to the longest distance Lzmax of the distances Lz1 to Lzn is preferably 0.50 or more. In other words, a ratio of a minimum value of distances between protrusion portions of the zigzag shape to a maximum value of distances between protrusion portions of the zigzag shape is preferably 1.05 or more. The ratio Lzmin/Lzmax of 0.50 or more means that distances between protrusion portions are not evenly distributed. Rather than distributing evenly, by varying distances between protrusion portions, the dispersion of the sound generated when the pneumatic tire 10 contacts the road surface is improved, and the pattern noise is improved. Note that the minimum value of the distances Lz1, Lz2, ..., Lzn is 3.0 mm.

Additionally, in FIG. 7, distances in the tire circumferential direction between the connection portions of the plurality of sipes 16 with the circumferential main groove 11A on the inner side in the tire width direction, the plurality of sipes 16 provided between the adjacent lug grooves 13, are each denoted as Ls1, Ls2, ..., Lsn, where n is a natural number of three or greater. The distances Ls1, Ls2, ..., Lsn are distances in the tire circumferential direction measured with reference to the connection portion of the inner side linear portion ST1 with the circumferential main groove 11A. The distance Ls1 and the distance Lsn are distances in the tire circumferential direction all measured with reference to the lug grooves 13 that are different from each other. In this case, a relationship between the distance Ls1 and the distance Lsn is preferably Ls1<Lsn. In other words, the distance Lsn of one end in the tire circumferential direction is preferably greater than the distance Ls1 of the other end. By varying distances between the inner side linear portion ST1 of the sipe 16 having the Z-shape, the edge effect is exhibited in a wider angle, and the snow performance can be improved. Note that the minimum value of the distances Ls1, Ls2, ..., Lsn is 2.5 mm.

In FIG. 7, distances in the tire circumferential direction between protrusion portions of the connection portions of the plurality of sipes 16 with the circumferential main groove 12A on the outer side in the tire width direction, the plurality of sipes 16 provided between the adjacent lug grooves 13, are each denoted as Lz1, Lz2, ..., Lzn, where n is a natural number of three or greater. The distance Lz1 and the distance Ls1 are distances in the tire circumferential direction measured with reference to the identical lug groove 13. Because the identical lug groove 13 is used as a reference, the distance Lz1 and the distance Ls1 have an inner side-outer side relationship in the tire width direction and are in corresponding positions. Also, the distance Lzn and the distance Lsn are distances in the tire circumferential direction measured with reference to the identical lug groove 13. Because the identical lug groove 13 is used as a reference, the distance Lzn and the distance Lsn have an inner side-outer side relationship in the tire width direction and are in corresponding positions. In this case, preferably, Ls1<Lz1 and Lsn>Lzn. In other words, in the tire circumferential direction, the relationship between the distance Ls1 and the distance Lz1 that are in corresponding positions is preferably such that the distance Lz1 at a position on the outer side in the tire width direction is greater than the distance Ls1 at a position on the inner side in the tire width direction. Because the distance Lz1 is greater than the distance Ls1, the length of the sipe in the extension direction increases, which increases the edge effect and improves snow performance. Additionally, in the tire circumferential direction, the relationship between the distance Lsn and the distance Lzn that are in corresponding positions is preferably such that the distance Lzn at a position on the outer side in the tire width direction is less than the distance Lsn at a position on the inner side in the tire width direction. Because the distance Lzn is less than the distance Lsn, the length of the sipe in the extension direction increases, which increases the edge effect and improves snow performance.

In FIG. 7, the sipe 16 is connected to the edge having the zigzag shape at a maximum amplitude position of the width W3 that is two-times an amplitude of the edge having a zigzag shape in the tire width direction. Accordingly, when stress is applied in the tire circumferential direction, stress applied to the protrusion portion that is prone to chip can be distributed along the groove wall of the sipe 16, and the tire chip resistance performance is improved. For example, when stress is applied in the tire circumferential direction as indicated by arrow YA, stress can be distributed along the groove wall of the sipe 16 as indicated by arrow YB. In this way, the tire chip resistance performance of the protrusion portion that is prone to chip is improved.

Figure 8A:
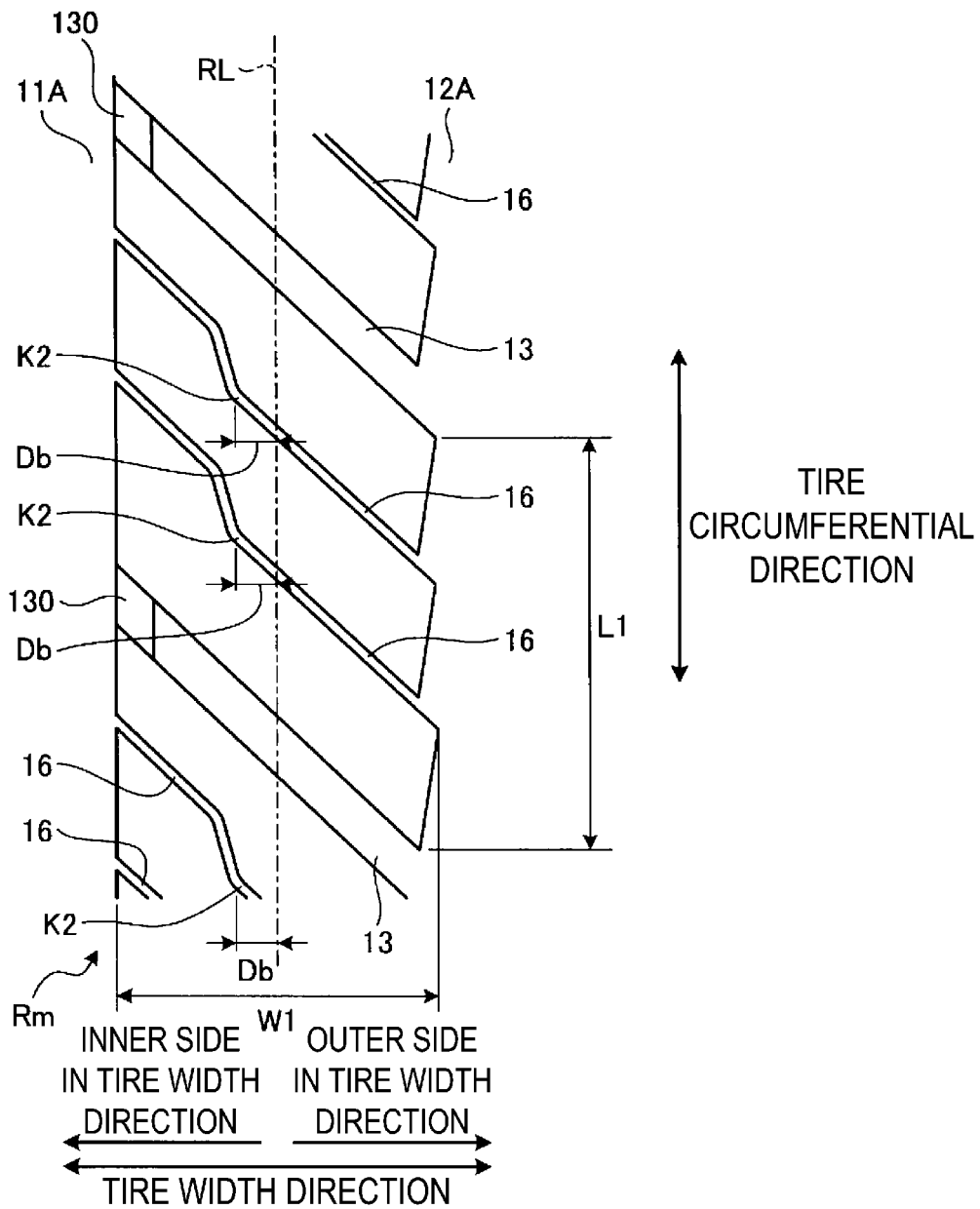
FIG. 8A is an enlarged view of a part of a middle land portion of the tread pattern illustrated in FIG. 2.
Figure 8B:
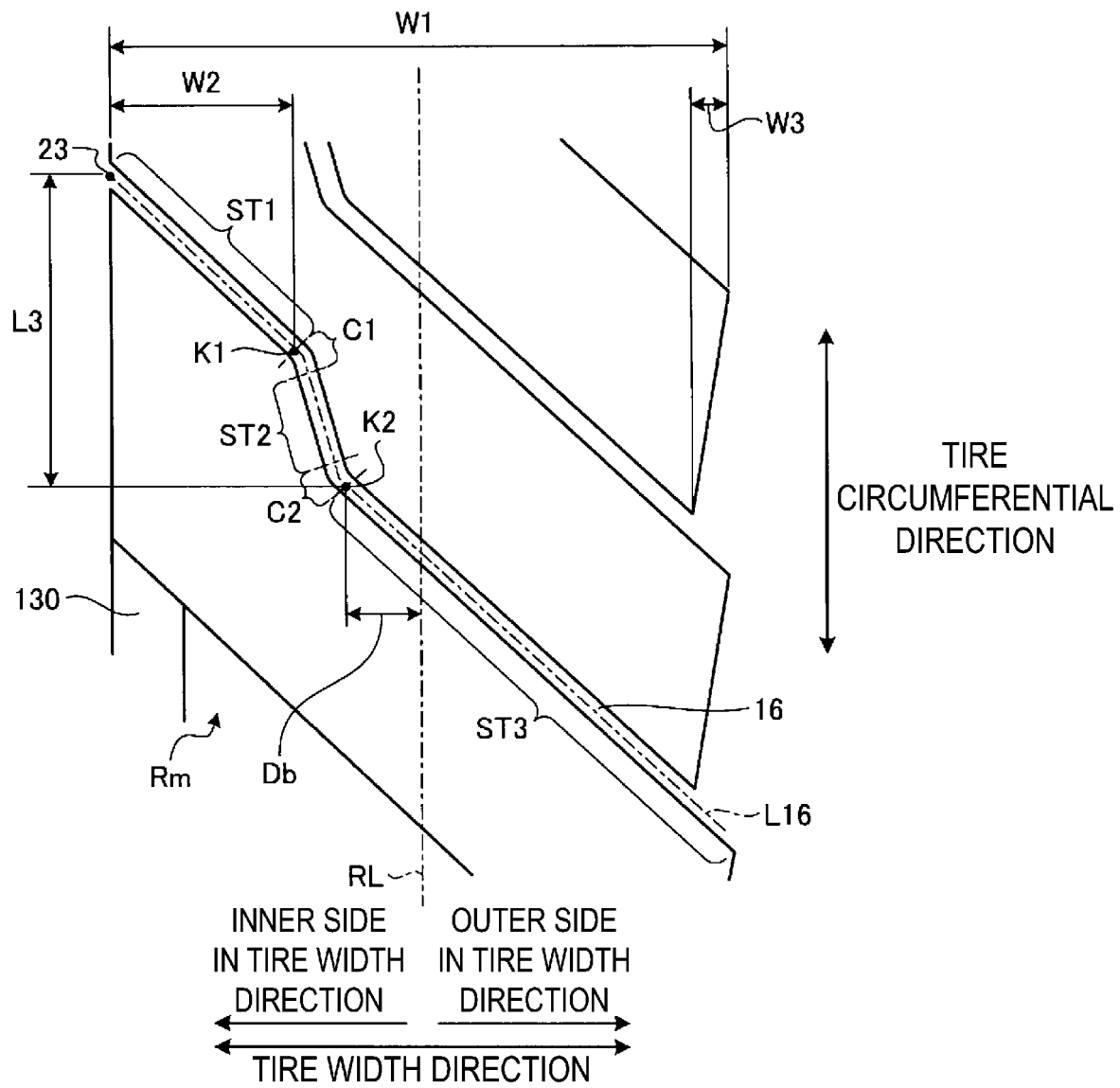
FIG. 8B is an enlarged view illustrating a part of FIG. 8A.

FIG. 8A is an enlarged view of a part of the middle land portion Rm of the tread pattern illustrated in FIG. 2. FIG. 8B is an enlarged view illustrating a part of FIG. 8A. In FIGS. 8A and 8B, the two bent portions C1, C2 of the sipe 16 are disposed on the inner side in the tire width direction of a center line RL passing through the center of the land portion Rm in the tire width direction. Of the two bent portions C1, C2, the bent portion C2 is positioned closer to the center line RL than the bent portion C1. The boundary between the bent portion C2 and the linear portion ST3 is an end point K2. A distance between the end point K2 and the center line RL in the tire width direction is denoted as db. A ratio db/W1 of the distance db to the maximum width W1 of the land portion Rm in the tire width direction is preferably 0 or more and 0.40 or less.

Here, a length in the tire circumferential direction, the length from a connection point 23 of the sipe 16 with the circumferential main groove 11A on the inner side in the tire width direction to the end point K2 on an inner side of the outer side linear portion ST3 in the tire width direction, is denoted as L3. A ratio L3/L1 of the length L3 to the length L1 is preferably 0.15 or more and 0.45 or less. When the ratio L3/L1 is greater than 0.45, the number of sipes cannot be increased, and thus the snow performance does not improve, which is not preferable. When the ratio L3/L1 is less than 0.15, a length of portions connecting the linear portion ST1 and the linear portion ST3 extending from both edge sides of the land portion Rm (that is, the bent portion C1, the linear portion ST2, and the bent portion C2) is reduced, and the edge effect is reduced and the snow performance does not improve, which is not preferable.

Also, a ratio L3/W1 of the length L3 to the maximum width W1 is preferably 0.15 or more and 0.65 or less. When the ratio L3/W1 is less than 0.15, the edge effect is reduced, and the snow performance is degraded, which is not preferable. When the ratio L3/W1 is greater than 0.65, the number of sipes cannot be increased, and thus the snow performance does not improve, which is not preferable.

Figure 9A:
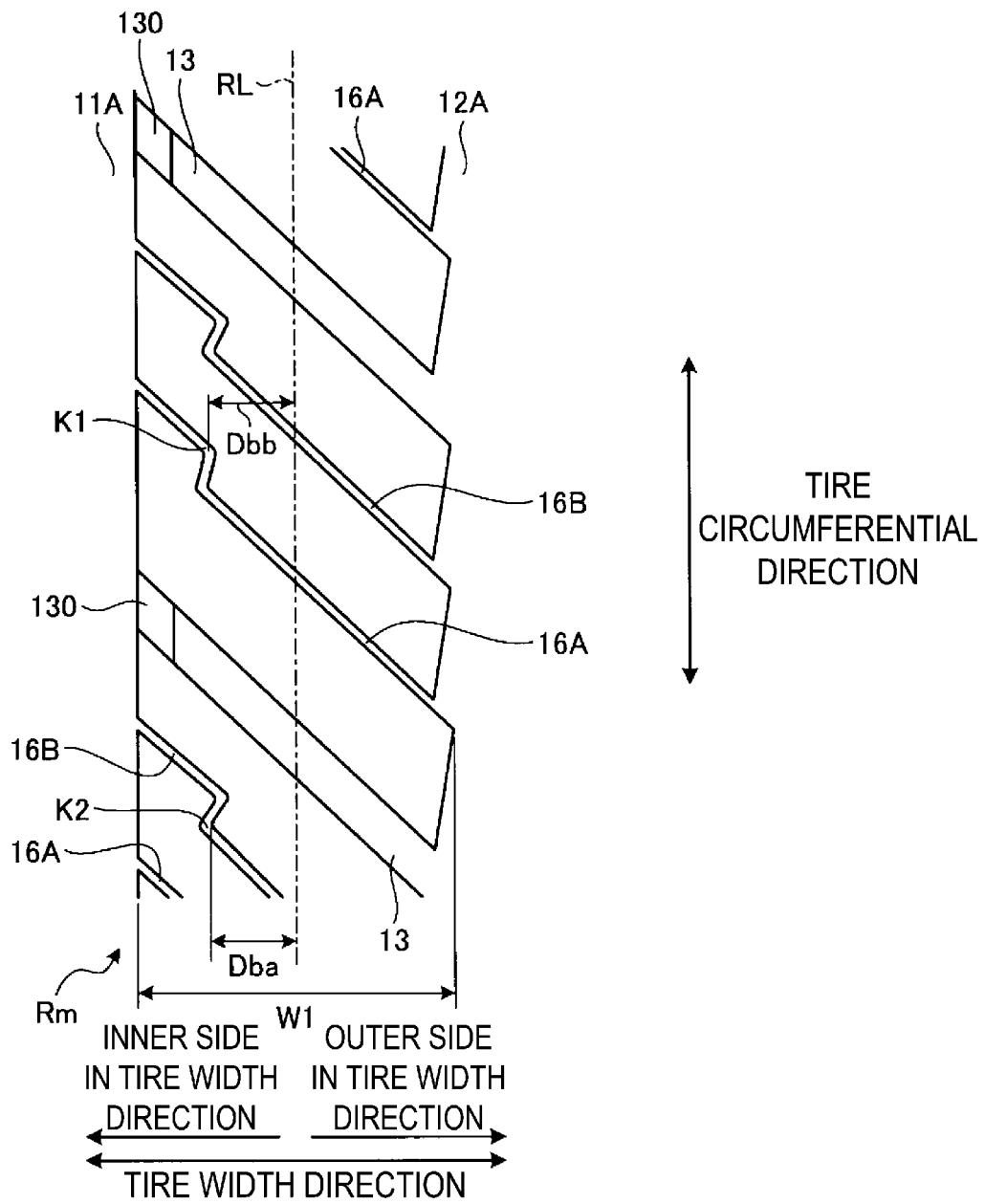
FIG. 9A is a diagram illustrating another example of the middle land portion.
Figure 9B:
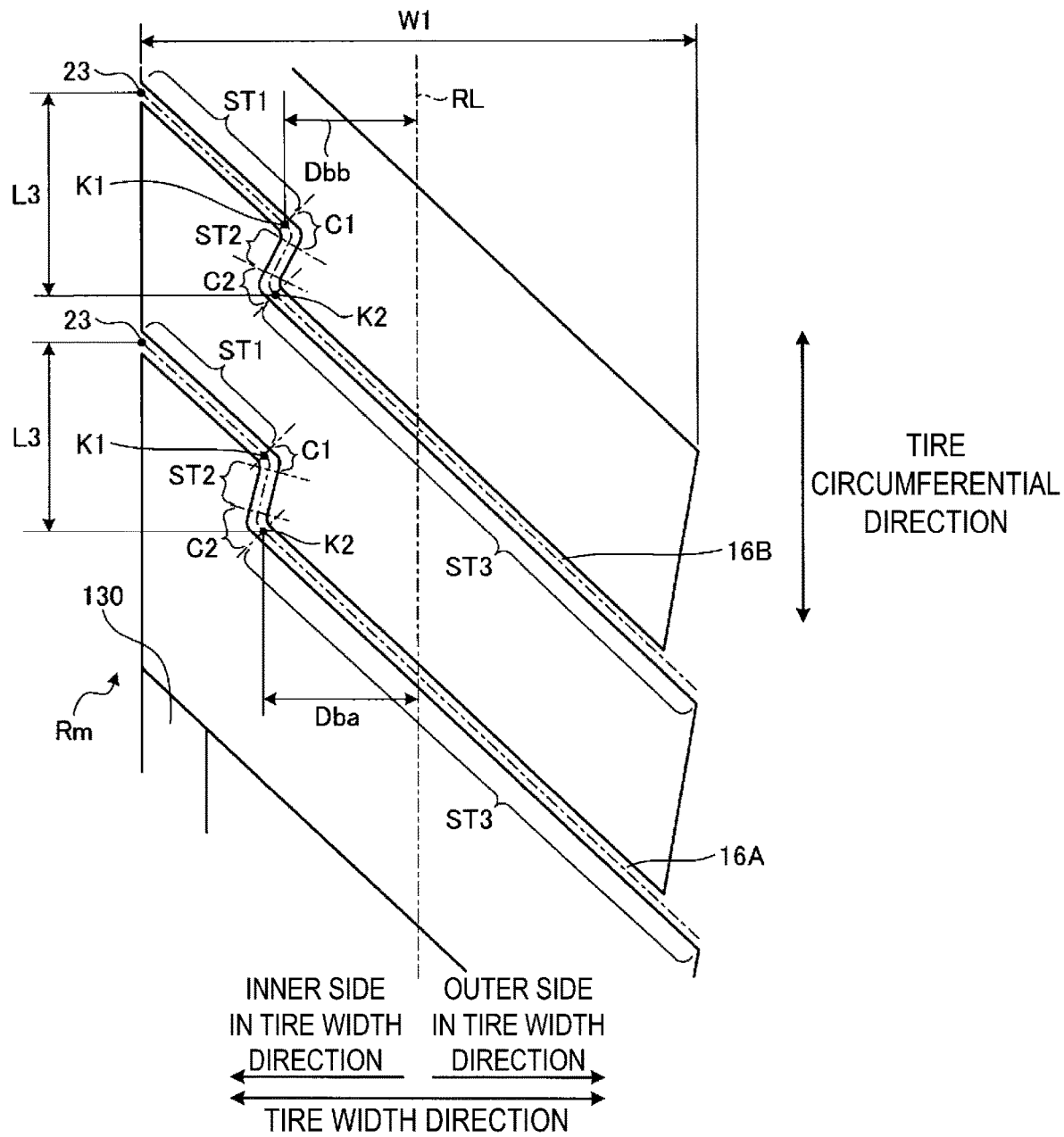
FIG. 9B is an enlarged view illustrating a part of FIG. 9A.

FIG. 9A is a diagram illustrating another example of the middle land portion Rm. FIG. 9B is an enlarged view illustrating a part of FIG. 9A. In FIGS. 9A and 9B, the bent portions C1, C2 of sipes 16A, 16B are disposed on the inner side in the tire width direction of the center line RL passing through the center of the land portion Rm in the tire width direction. In the sipe 16A, of the two bent portions C1, C2, the bent portion C2 is positioned closer to the center line RL than the bent portion C1. The boundary between the bent portion C2 and the linear portion ST3 is the end point K2. A distance between the end point K2 and the center line RL in the tire width direction is denoted as Dba. A ratio Dba/W1 of the distance Dba to the maximum width W1 of the land portion Rm in the tire width direction is preferably 0 or more and 0.40 or less.

Additionally, in the sipe 16B, of the two bent portions C1, C2, the bent portion C1 is positioned closer to the center line RL than the bent portion C2. The boundary between the bent portion C1 and the linear portion ST1 is the end point K1. A distance between the end point K1 and the center line RL in the tire width direction is denoted as Dbb. A ratio Dbb/W1 of the distance Dbb to the maximum width W1 of the land portion Rm in the tire width direction is preferably 0 or more and 0.40 or less.

Figure 10A:
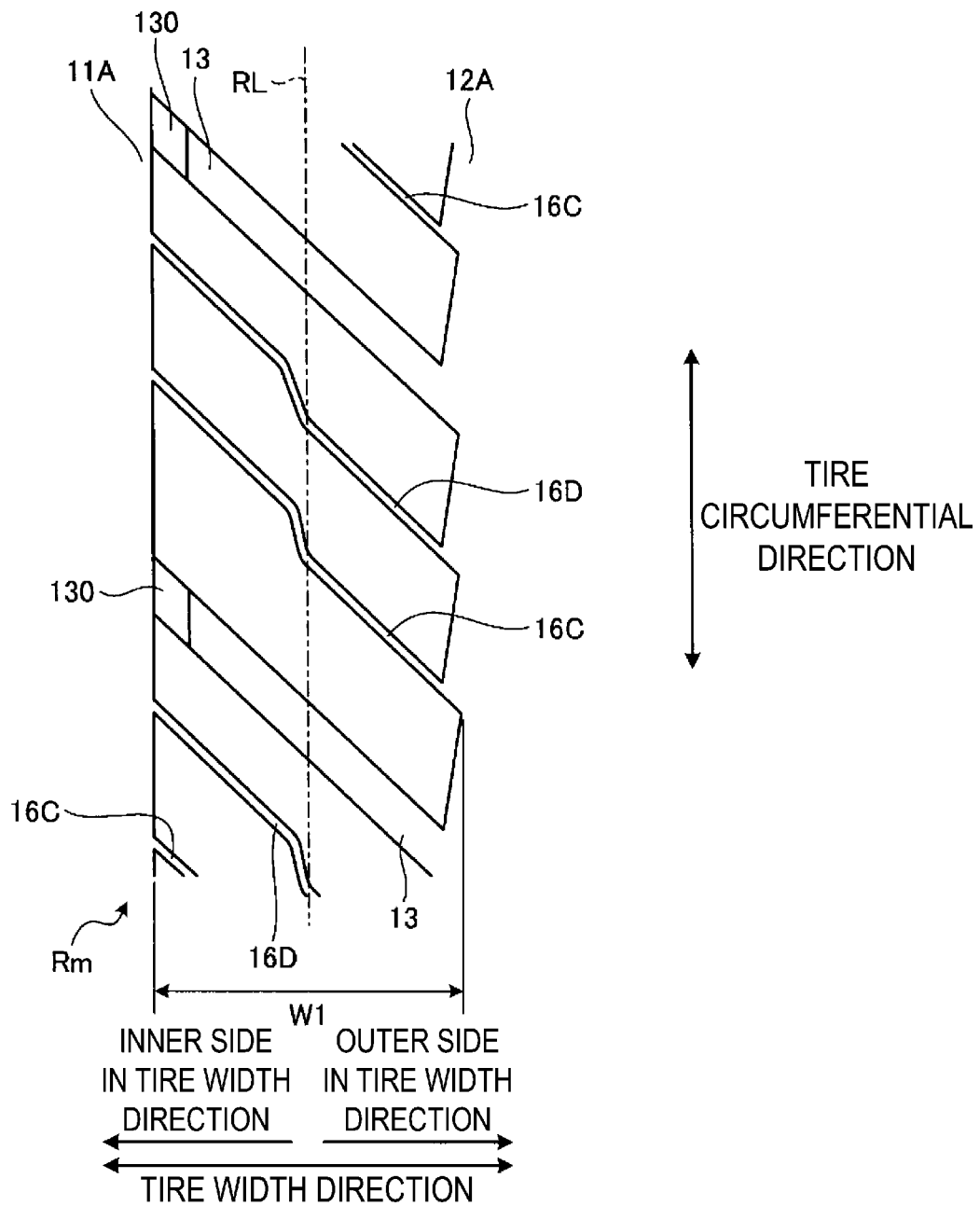
FIG. 10A is a diagram illustrating another example of the middle land portion.
Figure 10B:
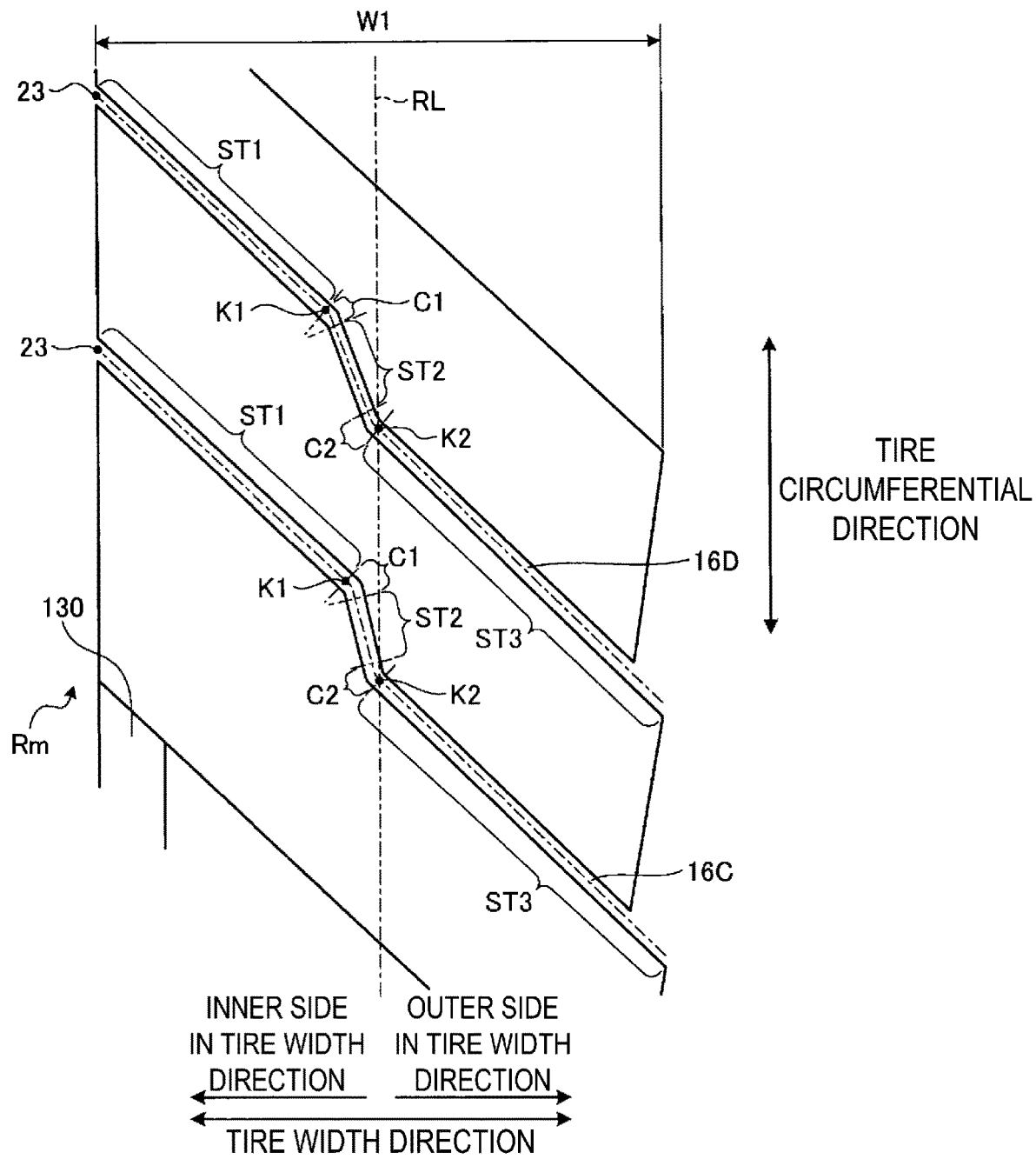
FIG. 10B is an enlarged view illustrating a part of FIG. 10A.

FIG. 10A is a diagram illustrating another example of the middle land portion Rm. FIG. 10B is an enlarged view illustrating a part of FIG. 10A. In FIGS. 10A and 10B, the bent portion C1 of a sipe 16C are disposed on the inner side in the tire width direction of the center line RL passing through the center of the land portion Rm in the tire width direction. The bent portion C2 of the sipe 16C is positioned on the center line RL. More specifically, the end point K2, which is the boundary between the bent portion C2 and the linear portion ST3, is positioned on the center line RL. In this case, the distance between the end point K2 and the center line RL in the tire width direction is 0, and thus the ratio db/W1=0. The same applies to the bent portion C2 of a sipe 16D.

Thus, in the case of FIGS. 10A and 10B, the condition that a ratio of a distance in the tire width direction between the bent portion C2 that is closer to the center line RL, the center line RL passing through a midpoint position of the land portion Rm in the tire width direction, and the center line RL to a width of the land portion Rm in the tire width direction is 0 or more and 0.40 or less is also satisfied. Note that one of the two bent portions C1, C2 may be provided on the inner side in the tire width direction of the center line RL, the center line RL passing through the midpoint position of the land portion Rm in the tire width direction, and the other may be positioned on the center line RL.

In this manner, of the two bent portions C1, C2, provided that the ratio of a distance in the tire width direction between a bend point of the bent portion that is the closer of the two bent portions to the center line RL, the center line RL passing through a midpoint position of the land portion Rm in the tire width direction, and the center line RL to a maximum width W1 of the land portion Rm in the tire width direction is 0 or more and 0.40 or less, the following effects can be achieved. In other words, the edge effect is increased by providing a zigzag groove and the sipe 16 having a generally Z-shape. When the bend point having the generally Z-shape and the zigzag portion are in close proximity, the block rigidity at or near the zig-zag portion decreases, and chipping may occur. Thus, by providing the bend point of the sipe 16 and the zigzag portion at separated positions, the snow performance and the tire chip resistance performance can be provided in a compatible manner.

Additionally, the groove width is the maximum distance between left and right groove walls at the groove opening portion and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, in a cross-sectional view normal to the groove length direction. Additionally, in a configuration in which the grooves extend in a zigzag-like or wave-like manner in the tire circumferential direction, the groove width is measured with reference to the center line of the amplitude of the groove walls.

The tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

Here, "specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a tire for a passenger vehicle, the specified internal pressure is an air pressure of 180 kPa, and the specified load is 88% of the maximum load capacity.

Relationship Between Sipe and Raised Bottom Portion of Lug Groove

Here, the two-dimensional portion of the sipe 16 in the land portion Rm is provided at an end portion on an inner side of the sipe 16 in the tire width direction. On the other hand, the three-dimensional portion of the sipe 16 in the land portion Rm is provided at an end portion on an outer side of the sipe 16 in the tire width direction. Also, as described above, in the land portion Rm, the raised bottom portion 130 of the lug groove 13 is provided at an open end on the inner side of the lug groove 13 in the tire width direction. Thus, the raised bottom portion 130 is provided at an open end on an identical side to an end portion of the sipe 16 at which the two-dimensional portion is provided, among open ends on both sides of the lug groove 13. In the lug groove 13, the raised bottom portion 130 is provided at an end portion on an identical side to an end portion of the sipe at which the two-dimensional portion having lower rigidity than the three-dimensional portion is provided. By providing the raised bottom portion 130 on the end portion on the two-dimensional portion side with low rigidity to increase the rigidity, the rigidity can be made uniform for the tire circumferential direction.

Moreover, the raised bottom portion is not provided at an open end on an identical side to an end portion of the sipe 16 at which the three-dimensional portion is provided, among open ends on both sides of the lug groove 13. The raised bottom portion 130 is provided only at the end portion on the inner side in the tire width direction where the two-dimensional portion is provided, and the raised bottom portion is not provided at the end portion on the outer side in the tire width direction where the three-dimensional portion is provided, and thus, a reduction in drainage performance can be suppressed.

Note that, due to the manufacturing convenience of the pneumatic tire 10, a sipe wall surface having a straight shape may be provided on an outer side of the three-dimensional portion in the tire width direction in any cross-sectional view (cross-sectional views including the sipe width direction and the sipe depth direction), where the sipe length direction is the normal direction. The portion having a straight shape provided for such manufacturing convenience is included in the three-dimensional portion. In other words, a sipe wall surface having a straight shape provided in a range of 15% of the sipe length from an end portion on the outer side of the sipe 16 in the tire width direction is considered to be a portion of the three-dimensional portion.

Figure 11:
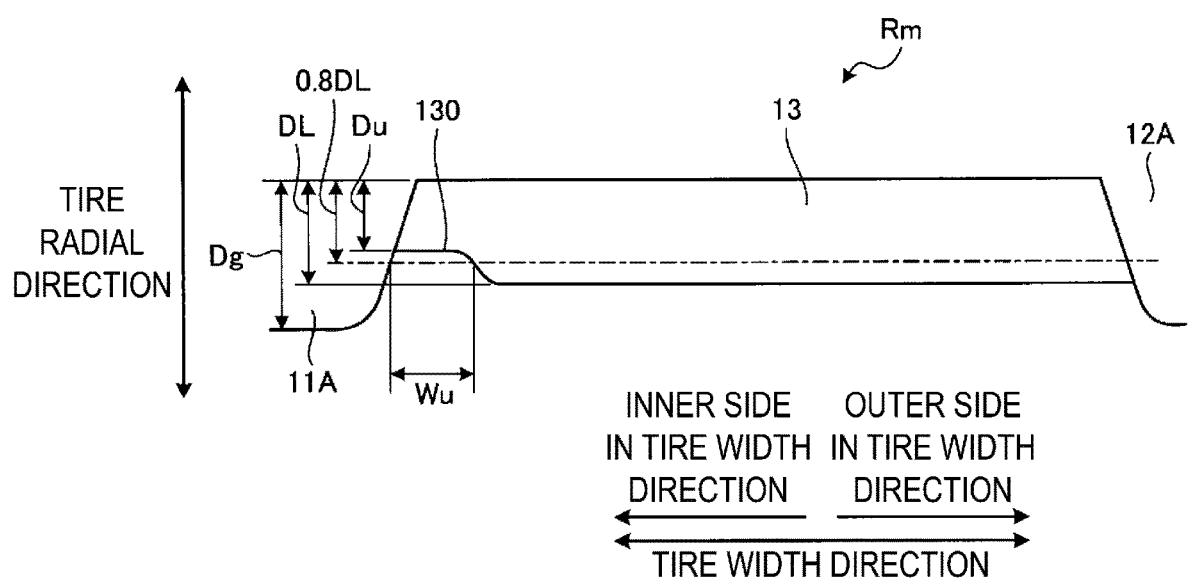
FIG. 11 is a cross-sectional view of a lug groove along an extension direction in FIG. 2.

FIG. 11 is a cross-sectional view of the lug groove 13 along an extension direction. A ratio DL/Dg of a groove depth DL of the lug groove 13 to a groove depth Dg of the circumferential main groove 11A is preferably 0.50 or more and 0.85 or less. When the ratio DL/Dg is greater than 0.85, block rigidity decreases and wear resistance performance decreases, which is not preferable. When the ratio DL/Dg is less than 0.50, the snow performance is degraded, which is not preferable.

As illustrated in FIG. 11, the raised bottom portion 130 is provided at a connection portion of the lug groove 13 with the circumferential main groove 11A. A ratio of a groove depth of a portion where the raised bottom portion 130 is provided to a groove depth of a portion where the raised bottom portion 130 is not provided, in other words, a ratio Du/DL of a groove depth Du of the lug groove 13 in the raised bottom portion 130 to the groove depth DL of the lug groove 13 is preferably 0.40 or more and 0.80 or less. When the ratio Du/DL is less than 0.40, drainage performance is degraded, which is not preferable. When the ratio Du/DL is greater than 0.80, sufficient block rigidity will not be obtained, and wear resistance performance decreases, which is not preferable.

In FIG. 11, a depth that is 80% of the groove depth DL of the lug groove 13 (the dot-dash line in FIG. 11) is denoted as the depth 0.8DL. The length of the raised bottom portion 130 in the tire width direction at the depth 0.8DL is denoted as Wu. A ratio Wu/W1 of the length Wu of the raised bottom portion 130 in the tire width direction to the maximum width W1 (see FIG. 4) of the land portion Rm in the tire width direction is preferably 0.15 or more and 0.50 or less. When the ratio Wu/W1 is less than 0.15, sufficient block rigidity will not be obtained, and uneven wear resistance performance will be negatively affected, which is not preferable. When the ratio Wu/W1 is greater than 0.50, the block rigidity of the sipe 16 on the three-dimensional portion side will be too high, and uneven wear resistance performance will be negatively affected, which is not preferable.

Shoulder Land Portion

Figure 12:
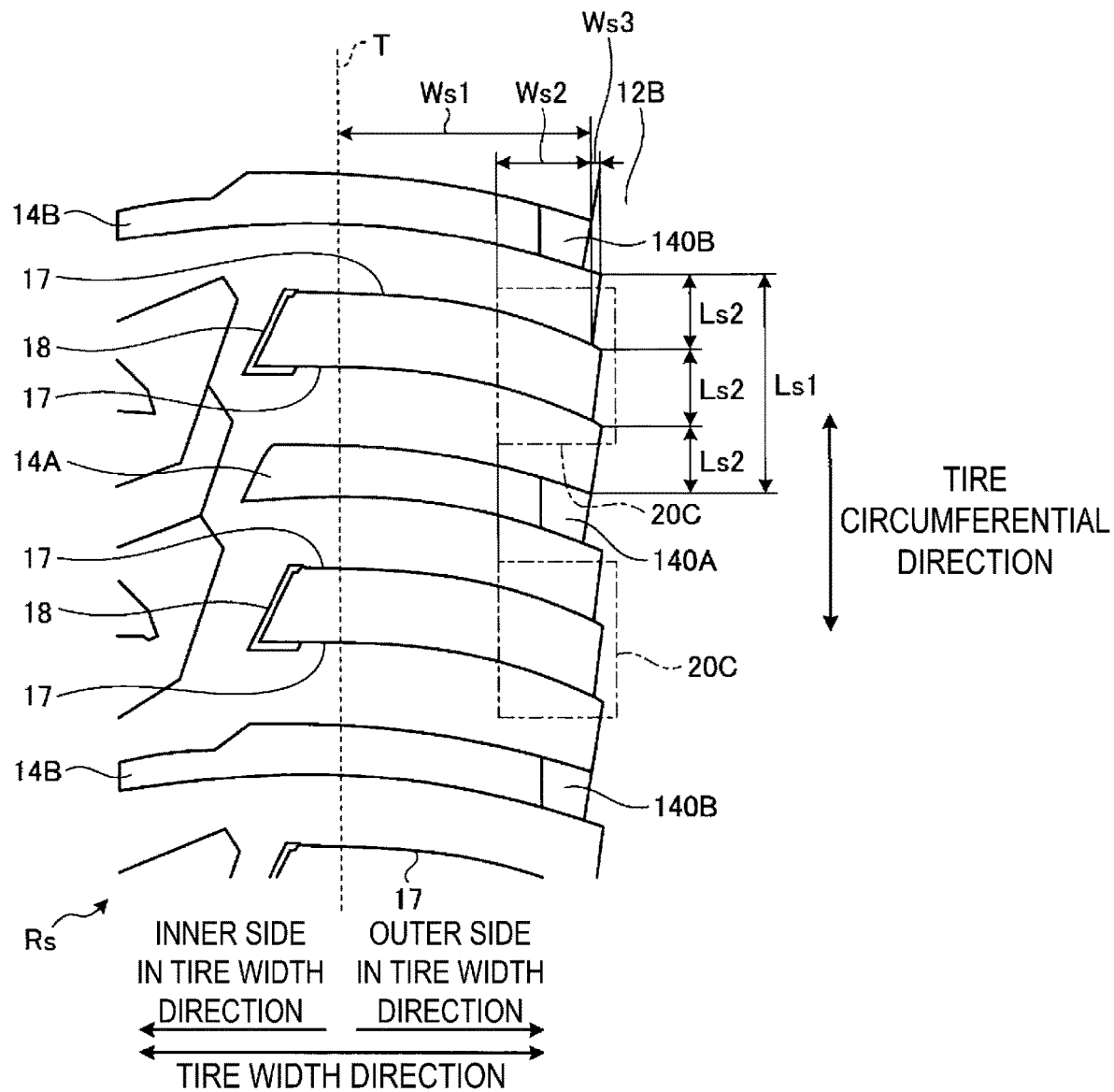
FIG. 12 is an enlarged view of a part of a shoulder land portion of the tread pattern illustrated in FIG. 2.

FIG. 12 is an enlarged view of a part of the shoulder land portion Rs of the tread pattern illustrated in FIG. 2. In FIG. 12, the land portion Rs on the outer side of the circumferential main groove 12B in the tire width direction includes the sipe (hereinafter, also referred to as a shoulder sipe) 17. A length (in other words, a width) of the three-dimensional portion of the sipe 17 in the tire width direction is denoted as Ws2. The length Ws2 is a length (in other words, a width) in the tire width direction from the edge of the circumferential main groove 12B in the land portion Rs to an end on the outer side of the three-dimensional portion of the sipe 17 in the tire width direction. Additionally, a length from the edge of the circumferential main groove 12B in the land portion Rs to the ground contact edge T, in other words, the ground contact width of the land portion Rs in the tire width direction is denoted as Ws1. In this case, a ratio Ws2/Ws1 is preferably 0.25 or more and 0.65 or less. When the ratio Ws2/Ws1 is less than 0.25, sufficient block rigidity will not be obtained, and uneven wear resistance performance will be negatively affected. When the ratio Ws2/Ws1 is greater than 0.65, block rigidity on the three-dimensional portion side will be too high, and pattern noise will be negatively affected, which is not preferable.

In FIG. 12, the land portion Rs includes the plurality of shoulder lug grooves 14A, 14B extending from the circumferential main groove 12B on the inner side in the tire width direction toward the outer side in the tire width direction. The plurality of shoulder lug grooves 14A, 14B preferably extend at least to the ground contact edge T. By extending the plurality of shoulder lug grooves 14A, 14B to the ground contact edge T, drainage performance can be improved.

The raised bottom portion 140A is provided at an open end of the shoulder lug groove 14A to the circumferential main groove 12B. Also, the raised bottom portion 140B is provided at an open end of the shoulder lug groove 14B to the circumferential main groove 12B. Although the rigidity is increased by the region 20C of three-dimensional portion provided between the shoulder lug groove 14A and the shoulder lug groove 14B, by providing the raised bottom portion 140A and the raised bottom portion 140B at the open ends to the circumferential main groove 12B, which tends to be less rigid, the rigidity can be made uniform in the tire circumferential direction.

Incidentally, in the land portion Rs, a length of the edge having a zigzag shape between adjacent shoulder lug grooves 14A, 14B in the tire circumferential direction is denoted as Ls1. Additionally, a distance between protrusion portions of the zigzag shape in the tire circumferential direction is denoted as Ls2. In this case, a ratio Ls2/Ls1 is preferably 0.15 or more and 0.55 or less. When the ratio Ls2/Ls1 is less than 0.15, recesses/protrusions of the zigzag shape are excessively fine and chip easily, which is not preferable. When the ratio Ls2/Ls1 is greater than 0.55, the edge effect cannot be sufficiently achieved, and the snow performance does not improve.

Further, in the land portion Rs, a ground contact width in the tire width direction is denoted as Ws1. Additionally, in the land portion Rs, a length that is two-times an amplitude of the zigzag shape of the edge on the circumferential main groove 12B side in the tire width direction is denoted as Ws3. The length Ws3 is a length (in other words, a width) of a protrusion portion of the zigzag shape in the tire width direction. In this case, a ratio Ws3/Ws1 is preferably 0.02 or more and 0.15 or less. When the ratio Ws3/Ws1 is less than 0.02, the edge effect does not occur, and the snow performance does not improve. When the ratio Ws3/Ws1 is greater than 0.15, drainage properties are impaired, and drainage performance is degraded.

Note that while the land portion Rs on the outer side of the circumferential main groove 12B in the tire width direction has been described above, similar description applies to the land portion Rs on the outer side of the circumferential main groove 12A in the tire width direction.

Inclination Direction of Each Sipe

Figure 13:
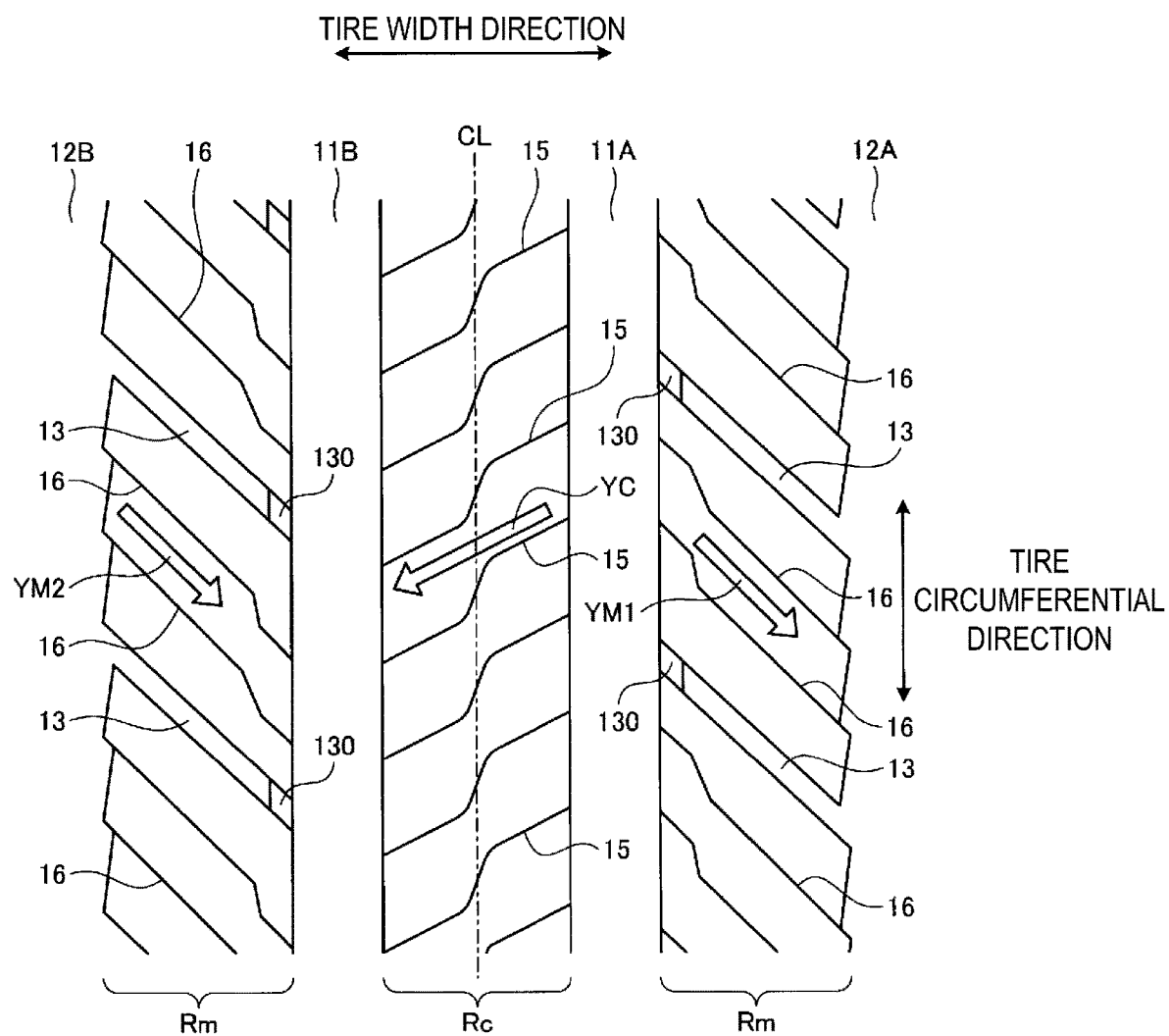
FIG. 13 is a view illustrating the inclination direction of each sipe in FIG. 2.

FIG. 13 is a diagram illustrating the inclination direction of each sipe in FIG. 2. FIG. 13 is an enlarged view illustrating a part of FIG. 2. In FIG. 13, the inclination direction of the center sipes 15 provided in the center land portion Rc with respect to the tire circumferential direction is denoted by an arrow YC. On the other hand, the inclination direction of the middle sipes 16, 16 provided in the middle land portion Rm with respect to the tire circumferential direction is denoted by an arrow YM1 and an arrow YM2. Thus, the inclination directions of the middle sipes 16, 16 provided in the middle land portion Rm are identical to each other. The inclination directions of the middle sipes 16, 16 and the inclination direction of the center sipe 15 provided in the center land portion Rc are different from each other. The inclination directions of the sipes differs between the middle land portion Rm and the center land portion Rc, and thus edge effects in other directions occur, and the handling on snow performance is improved.

Three-Dimensional Portion of Composite Sipe

Figure 14:
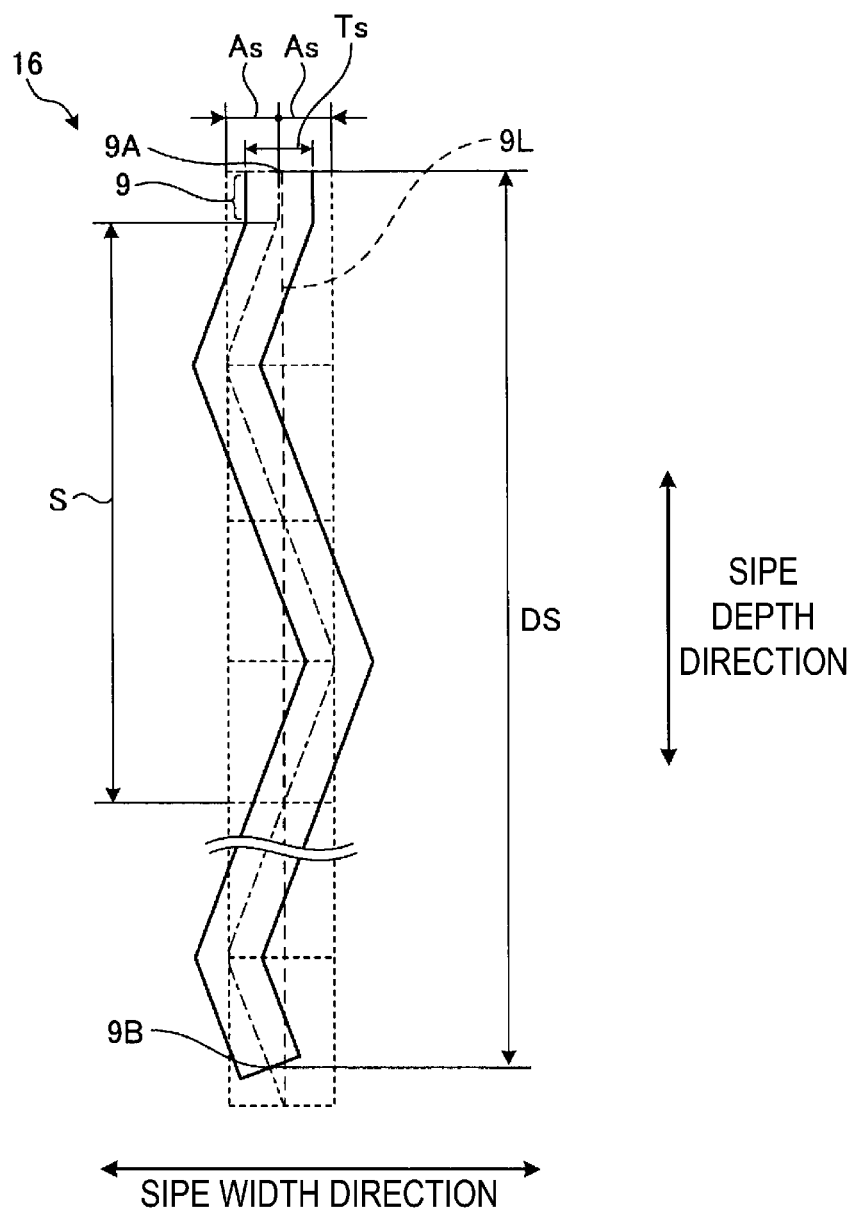
FIG. 14 is a cross-sectional view illustrating an example of a three-dimensional portion of a composite sipe in FIG. 2.

FIG. 14 is a cross-sectional view illustrating an example of a three-dimensional portion of the composite sipe 16 in FIG. 2. FIG. 14 is a view illustrating a cross section in which a section of the three-dimensional portion of the composite sipe 16 is cut in a plane orthogonal to the extension direction (in other words, the length direction) of the sipe. In FIG. 14, a length in the sipe depth direction, from an open end 9A to the road contact surface of the composite sipe 16 to a groove bottom 9B, in other words, a groove depth, is DS. A groove width (in other words, a sipe width) of the composite sipe 16 is Ts.

The composite sipe 16 in the vicinity of the open end 9A is a linear portion 9 along the sipe depth direction. The composite sipe 16 has a shape that curves or bends with respect to the sipe depth direction. An amplitude of the curve or bend in the sipe width direction centered on a line 9L, the line 9L an extension of the center line of the linear portion 9, is As. The ratio As/Ts of the amplitude As to the groove width Ts is preferably 0.40 or more and 0.80 or less. When the ratio As/Ts is greater than 0.80, releasing of the mold during vulcanization molding becomes poor, and a fault occurs, which is not preferable. When the ratio As/Ts is less than 0.40, inclination cannot be suppressed and the block rigidity does not increase, and wear resistance performance is not improved, which is not preferable.

Additionally, in FIG. 14, one period length of curve or bend of the composite sipe 16 is S. The composite sipe 16 preferably has a curved shape or a bent shape that is one period length or more and three period lengths or less. When the period length is less than one period length, the effect of suppressing inclination will be insufficient and block rigidity will not increase, which is not preferable. When the period length is greater than three period lengths, releasing of the mold during vulcanization molding is poor, and a fault occurs, which is not preferable.

Note that the other composite sipes 15 and 17 in FIG. 2 have identical structures to the composite sipe 16 described above.

Groove Depth

Figure 15:
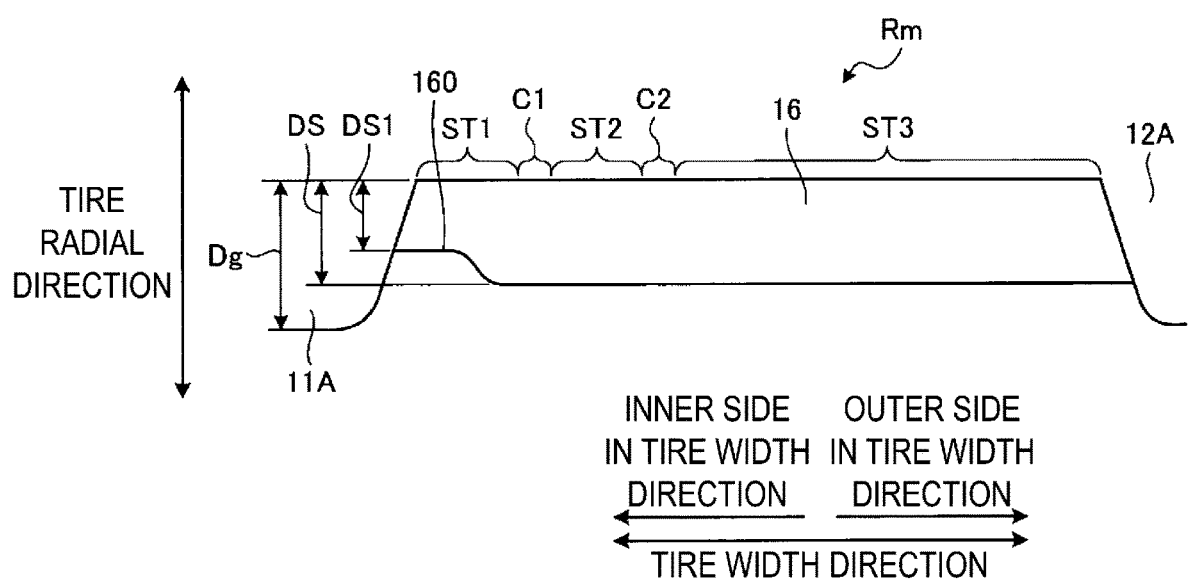
FIG. 15 is a cross-sectional view of the sipe of FIG. 5 along an extension direction.

FIG. 15 is a cross-sectional view of the sipe 16 of FIG. 5 along the extension direction. FIG. 15 illustrates the two-dimensional portion and the three-dimensional portion without distinction. A ratio DS/Dg of a groove depth DS of the sipe 16 to a groove depth Dg of the circumferential main groove 11A is preferably 0.50 or more and 0.85 or less. When the ratio DS/Dg is greater than 0.85, block rigidity decreases and wear resistance performance decreases, which is not preferable. When the ratio DS/Dg is less than 0.50, the edge effect is not sufficient, and snow performance is degraded, which is not preferable.

As illustrated in FIG. 15, a raised bottom portion 160 is provided at a connection portion of the sipe 16 with the circumferential main groove 11A. The raised bottom portion 160 is a sipe raised bottom portion provided in the sipe 16. A ratio DS1/DS of a groove depth DS1 of the sipe 16 at the raised bottom portion 160 to the groove depth DS of the sipe 16 is preferably 0.50 or more and 0.85 or less. When the ratio DS1/DS is greater than 0.85, block rigidity decreases and wear resistance performance decreases, which is not preferable. When the ratio DS1/DS is less than 0.50, the edge effect is not sufficient, and snow performance is degraded, which is not preferable.

Also, for the sipe 15 of the center land portion Rc and the sipe 17 of the shoulder land portions Rs, a ratio of a groove depth of each of the sipes 15, 17 to the groove depth Dg of the circumferential main groove 11A is preferably 0.50 or more and 0.85 or less. When the ratio is greater than 0.85, block rigidity decreases and wear resistance performance decreases, which is not preferable. When the ratio is less than 0.50, the edge effect is not sufficient, and snow performance is degraded, which is not preferable.

EXAMPLES

Table 1 to Table 4 are tables showing the results of performance tests of pneumatic tires according to embodiments of the present technology. In the performance tests, mutually differing pneumatic tires were evaluated for uneven wear resistance performance, braking on snow performance, handling on snow performance, and drainage performance. In these performance tests, a test tire having a size of 225/65R17 102H was mounted on a rim having a rim size of 17×7.0J, and inflated to an air pressure of 230 kPa. Additionally, a front engine-front drive (FF) sport utility vehicle (SUV) with an engine displacement of 2500 cc was used as a test vehicle.

In the evaluation of uneven wear resistance performance, the test vehicle traveled for ten thousand km on the paved road, and then the amount of wear of the center land portion and the amount of wear of the shoulder land portion were measured, and the uneven wear amount ratio was calculated. Uneven wear amount ratios are expressed as index values and evaluated with Conventional Example being assigned as the reference (100) described below. Larger index values are preferable.

The braking on snow performance was evaluated as index values derived from the braking distance at a speed of 30 km/h on snow-covered road surfaces. Results of the evaluation are expressed as index values and evaluated with Conventional Example being assigned as the reference (100) described below. Larger values are preferable.

The handling on snow performance was evaluated as index values derived from the feelings by the test driver of steering stability on snow-covered road surfaces. Results of the evaluation are expressed as index values and evaluated with Conventional Example being assigned as the reference (100) described below. Larger values are preferable.

The pattern noise performance was evaluated by measuring vehicle interior noise in a vehicle traveling at a speed of 100 km/h. The entire frequency band of the vehicle interior noise was covered. The noise measured value in dB was used for the evaluation that is based on Conventional Example described below as reference (0 dB). Smaller values are preferable.

The pneumatic tires of Examples 1 to 18 are tires provided with two or more circumferential main grooves in a half region demarcated by the tire equatorial plane, and a plurality of land portions defined by the circumferential main grooves. Additionally, the center land portion that is the closest of the plurality of land portions to the tire equatorial plane is provided with a center sipe extending in the tire width direction, and the center sipe is a composite sipe including a two-dimensional portion and three-dimensional portions provided on both sides of the two-dimensional portion in the tire width direction. Furthermore, the middle land portion adjacent to an outer side of the center land portion in the tire width direction is provided with a middle sipe extending in the tire width direction, and the middle sipe has a Z-shape and is a composite sipe including a two-dimensional portion provided on the inner side in the tire width direction and a three-dimensional portion provided on an outer side of the two-dimensional portion in the tire width direction.

Pneumatic tires of Examples 1 to 18 were set as shown in Tables 1 to 4. In other words, pneumatic tires are prepared that are each with and without both ends of the center sipe being 3D sipes while the center of the center sipe being a 2D sipe, with and without a ratio Wc3/Wc of the length Wc3 of a three-dimensional portion of the center sipe to the length Wc of the entire center sipe being 0.30 or more and 0.70 or less, with and without both ends of the middle sipe being 3D sipes while an inner side of the middle sipe in the tire width direction being a 2D sipe, with and without the ratio Wc2/Wm of the length Wc2 of a three-dimensional portion of the middle sipe to the length Wm of the entire middle sipe being 0.25 or more and 0.80 or less, with and without the ratio db/W1 of a distance in the tire width direction between the bent portion that is the closer of the two bent portions of the Z-shape of the middle sipe to the center line, the center line passing through the midpoint position of the middle land portion in the tire width direction, and the center line to a width of the middle land portion in the tire width direction being 0 or more and 0.40 or less, with and without both ends of the shoulder sipe being 2D sipes while an inner side of the shoulder sipe in the tire width direction being a 3D sipe, and with and without the ratio Ws2/Ws1 of the length Ws2 of the three-dimensional portion of the shoulder sipe to the length Ws1 of the entire shoulder sipe being 0.25 or more and 0.65 or less. Note that above pneumatic tires are each with the ratio Lzmin/Lzmax of a minimum value of distances between protrusion portions of the zigzag shape to a maximum value of distances between protrusion portions of the zigzag shape being 0.50 or more.

The pneumatic tire of Conventional Example is a tire in which the entire sipe provided in the land portion is a 2D sipe. The pneumatic tire of Comparative Example 1 is a tire in which the entire sipe provided in the land portion is a 3D sipe. The pneumatic tire of Comparative Example 2 is a tire in which the center of the center sipe is a 3D sipe, both sides thereof are 2D sipes, the inner side of the middle sipe in the tire width direction is a 2D sipe, the outer side thereof is a 3D sipe, the inner side of the shoulder sipe is a 3D sipe, and the outer side thereof is a 2D sipe. The pneumatic tire of Comparative Example 3 is a tire in which the center of the center sipe is a 2D sipe, both sides thereof are 3D sipes, the inner side of the middle sipe in the tire width direction is a 3D sipe, the outer side thereof is a 2D sipe, the inner side of the shoulder sipe is a 3D sipe, and the outer side thereof is a 2D sipe. The pneumatic tire of Comparative Example 4 is a tire in which the center of the center sipe is a 2D sipe, both sides thereof are 3D sipes, the inner side of the middle sipe in the tire width direction is a 2D sipe, the outer side thereof is a 3D sipe, the inner side of the shoulder sipe is a 2D sipe, and the outer side thereof is a 3D sipe.

Note that in Tables 1 to 4, "2D" of the sipe shape indicates that the sipe is a sipe formed only from a two-dimensional portion. "3D" of the sipe shape indicates that the sipe is formed only from a three-dimensional portion. "2D+3D" of the sipe shape indicates a composite sipe formed from a two-dimensional portion and a three-dimensional portion.

The pneumatic tires were evaluated for uneven wear resistance performance, braking on snow performance, handling on snow performance, pattern noise performance, and drainage performance by the evaluation methods described above. The results are shown in Tables 1 to 4.

As shown in Tables 1 to 4, good results were obtained when both ends of the center sipe being 3D sipes while the center of the center sipe being a 2D sipe, when the ratio Wc3/Wc of the length Wc3 of a three-dimensional portion of the center sipe to the length Wc of the entire center sipe being 0.30 or more and 0.70 or less, when both ends of the middle sipe being 3D sipes while the inner side of the middle sipe in the tire width direction being a 2D sipe, when a ratio Wc2/Wm of the length Wc2 of a three-dimensional portion of the middle sipe to the length Wm of the entire middle sipe being 0.25 or more and 0.80 or less, when the ratio db/W1 of a distance in the tire width direction between the bent portion that is the closer of the two bent portions of the Z-shape of the middle sipe to the center line, the center line passing through the midpoint position of the middle land portion in the tire width direction, and the center line to a width of the middle land portion in the tire width direction being 0 or more and 0.40 or less, when the ratio Lzmin/Lzmax of a minimum value of distances between protrusion portions of the zigzag shape to a maximum value of distances between protrusion portions of the zigzag shape being 0.50 or more, when both ends of the shoulder sipe being 2D sipes while the inner side of the shoulder sipe in the tire width direction being a 3D sipe, and when the ratio Ws2/Ws1 of the length Ws2 of the three-dimensional portion of the shoulder sipe to the length Ws1 of the entire shoulder sipe being 0.25 or more and 0.65 or less.

TABLE 1-1

|  | Conventional example | Comparative Example 1 | Comparative Example 2 |
|---|---|---|---|
| Sipe form | All 2D | All 3D | 2D + 3D |
| Structure of center sipe | 2D | 3D | 3D in center, 2D in both ends |
| Ratio Wc3/Wc | — | 1.00 | 0.48 |
| Structure of middle sipe | — | 3D | 2D on inner side, 3D on outer side |
| Ratio Wc2/Wm | — | 1.00 | 0.53 |
| Shape of middle sipe | Straight | Straight | Z-shape |
| Ratio Db/W1 | — | — | 0.20 |
| Shape of edge on outer side of middle land portion in tire width direction | Straight | Straight | Zigzag |
| Structure of shoulder sipe | Straight | 3D | 3D on inner side, 2D on outer side |
| Ratio Ws2/Ws1 | — | 1.00 | 0.43 |
| Uneven wear resistance performance (index value) | 100 | 112 | 105 |
| Braking on snow performance (index value) | 100 | 107 | 106 |
| Handling on snow performance (index value) | 100 | 108 | 108 |
| Pattern noise performance [dB] | 0.0 | +0.8 | 0.0 |

TABLE 1-2

|  | Comparative Example 3 | Comparative Example 4 | Example 1 | Example 2 |
|---|---|---|---|---|
| Sipe form | 2D + 3D | 2D + 3D | 2D + 3D | 2D + 3D |
| Structure of center sipe | 2D in center, 3D in both ends | 2D in center, 3D in both ends | 2D in center, 3D in both ends | 2D in center, 3D in both ends |
| Ratio Wc3/Wc | 0.48 | 0.48 | 0.48 | 0.28 |

TABLE 1-2-continued

|  | Comparative Example 3 | Comparative Example 4 | Example 1 | Example 2 |
| --- | --- | --- | --- | --- |
| Structure of middle sipe | 3D on inner side, 2D on outer side | 2D on inner side, 3D on outer side | 2D on inner side, 3D on outer side | 2D on inner side, 3D on outer side |
| Ratio Wc2/Wm | 0.53 | 0.53 | 0.53 | 0.53 |
| Shape of middle sipe | Z-shape | Z-shape | Z-shape | Z-shape |
| Ratio Db/W1 | 0.20 | 0.20 | 0.20 | 0.20 |
| Shape of edge on outer side of middle land portion in tire width direction | Zigzag | Zigzag | Zigzag | Zigzag |
| Structure of shoulder sipe | 3D on inner side, 2D on outer side | 2D on inner side, 3D on outer side | 3D on inner side, 2D on outer side | 3D on inner side, 2D on outer side |
| Ratio Ws2/Ws1 | 0.43 | 0.43 | 0.43 | 0.43 |
| Uneven wear resistance performance (index value) | 104 | 102 | 110 | 103 |
| Braking on snow performance (index value) | 106 | 106 | 106 | 106 |
| Handling on snow performance (index value) | 108 | 108 | 108 | 104 |
| Pattern noise performance [dB] | 0.0 | 0.0 | 0.0 | 0.0 |

TABLE 2

|  | Example 3 | Example 4 | Example 5 | Example 6 | Example 7 | Example 8 |
| --- | --- | --- | --- | --- | --- | --- |
| Sipe form | 2D + 3D | 2D + 3D | 2D + 3D | 2D + 3D | 2D + 3D | 2D + 3D |
| Structure of center sipe | 2D in center, 3D in both ends | 2D in center, 3D in both ends | 2D in center, 3D in both ends | 2D in center, 3D in both ends | 2D in center, 3D in both ends | 2D in center, 3D in both ends |
| Ratio Wc3/Wc | 0.30 | 0.70 | 0.82 | 0.48 | 0.48 | 0.48 |
| Structure of middle sipe | 2D on inner side, 3D on outer side | 2D on inner side, 3D on outer side | 2D on inner side, 3D on outer side | 2D on inner side, 3D on outer side | 2D on inner side, 3D on outer side | 2D on inner side, 3D on outer side |
| Ratio Wc2/Wm | 0.25 | 0.80 | 0.53 | 0.23 | 0.25 | 0.80 |
| Shape of middle sipe | Z-shape | Z-shape | Z-shape | Z-shape | Z-shape | Z-shape |
| Ratio Db/W1 | 0.20 | 0.20 | 0.20 | 0.20 | 0.20 | 0.20 |
| Shape of edge on outer side of middle land portion in tire width direction | Zigzag | Zigzag | Zigzag | Zigzag | Zigzag | Zigzag |
| Structure of shoulder sipe | 3D on inner side, 2D on outer side | 3D on inner side, 2D on outer side | 3D on inner side, 2D on outer side | 3D on inner side, 2D on outer side | 3D on inner side, 2D on outer side | 3D on inner side, 2D on outer side |
| Ratio Ws2/Ws1 | 0.43 | 0.43 | 0.43 | 0.43 | 0.43 | 0.43 |
| Uneven wear resistance performance (index value) | 104 | 108 | 110 | 102 | 106 | 108 |
| Braking on snow performance (index value) | 106 | 106 | 106 | 106 | 106 | 106 |
| Handling on snow performance (index value) | 102 | 110 | 108 | 102 | 104 | 108 |
| Pattern noise performance [dB] | 0.0 | 0.0 | +0.4 | 0.0 | 0.0 | 0.0 |

TABLE 3

|  | Example 9 | Example 10 | Example 11 | Example 12 | Example 13 |
|---|---|---|---|---|---|
| Sipe form | 2D + 3D | 2D + 3D | 2D + 3D | 2D + 3D | 2D + 3D |
| Structure of center sipe | 2D in center, 3D in both ends | 2D in center, 3D in both ends | 2D in center, 3D in both ends | 2D in center, 3D in both ends | 2D in center, 3D in both ends |
| Ratio Wc3/Wc | 0.48 | 0.48 | 0.48 | 0.48 | 0.48 |
| Structure of middle sipe | 2D on inner side, 3D on outer side | 2D on inner side, 3D on outer side | 2D on inner side, 3D on outer side | 2D on inner side, 3D on outer side | 2D on inner side, 3D on outer side |
| Ratio Wc2/Wm | 0.82 | 0.53 | 0.53 | 0.53 | 0.53 |
| Shape of middle sipe | Z-shape | Z-shape | Z-shape | Z-shape | Z-shape |
| Ratio Db/W1 | 0.20 | 0.00 | 0.20 | 0.30 | 0.40 |
| Shape of edge on outer side of middle land portion in tire width direction | Zigzag | Zigzag | Zigzag | Zigzag | Zigzag |
| Structure of shoulder sipe | 3D on inner side, 2D on outer side | 3D on inner side, 2D on outer side | 3D on inner side, 2D on outer side | 3D on inner side, 2D on outer side | 3D on inner side, 2D on outer side |
| Ratio Ws2/Ws1 | 0.43 | 0.43 | 0.43 | 0.43 | 0.43 |
| Uneven wear resistance performance (index value) | 108 | 108 | 110 | 110 | 108 |
| Braking on snow performance (index value) | 106 | 106 | 106 | 106 | 104 |
| Handling on snow performance (index value) | 108 | 108 | 108 | 108 | 106 |
| Pattern noise performance [dR] | +0.5 | 0.0 | 0.0 | 0.0 | 0.0 |

TABLE 4

|  | Example 14 | Example 15 | Example 16 | Example 17 | Example 18 |
|---|---|---|---|---|---|
| Sipe form | 2D + 3D | 2D + 3D | 2D + 3D | 2D + 3D | 2D + 3D |
| Structure of center sipe | 2D in center, 3D in both ends | 2D in center, 3D in both ends | 2D in center, 3D in both ends | 2D in center, 3D in both ends | 2D in center, 3D in both ends |
| Ratio Wc3/Wc | 0.48 | 0.48 | 0.48 | 0.48 | 0.48 |
| Structure of middle sipe | 2D on inner side, 3D on outer side | 2D on inner side, 3D on outer side | 2D on inner side, 3D on outer side | 2D on inner side, 3D on outer side | 2D on inner side, 3D on outer side |
| Ratio Wc2/Wm | 0.53 | 0.53 | 0.53 | 0.53 | 0.53 |
| Shape of middle sipe | Z-shape | Z-shape | Z-shape | Z-shape | Z-shape |
| Ratio Db/W1 | 0.50 | 0.20 | 0.20 | 0.20 | 0.20 |
| Shape of edge on outer side of middle land portion in tire width direction | Zigzag | Zigzag | Zigzag | Zigzag | Zigzag |
| Structure of shoulder sipe | 3D on inner side, 2D on outer side | 3D on inner side, 2D on outer side | 3D on inner side, 2D on outer side | 3D on inner side, 2D on outer side | 3D on inner side, 2D on outer side |
| Ratio Ws2/Ws1 | 0.43 | 0.23 | 0.25 | 0.65 | 0.67 |
| Uneven wear resistance performance (index value) | 104 | 104 | 106 | 108 | 108 |
| Braking on snow performance (index value) | 102 | 106 | 106 | 106 | 106 |
| Handling on snow performance (index value) | 102 | 102 | 104 | 110 | 110 |

TABLE 4-continued

| | Example 14 | Example 15 | Example 16 | Example 17 | Example 18 |
|---|---|---|---|---|---|
| Pattern noise performance [dB] | 0.0 | 0.0 | 0.0 | 0.0 | +0.6 |

The invention claimed is:

1. A pneumatic tire, comprising:
a tread pattern comprising
two or more circumferential main grooves provided in a half region demarcated by a tire equatorial plane, and a plurality of land portions defined by the circumferential main grooves,
a center land portion that is a closest land portion of the plurality of land portions to the tire equatorial plane comprising a center sipe extending in a tire width direction;
the center sipe being a composite sipe comprising a two-dimensional portion and three-dimensional portions provided on both sides of the two-dimensional portion in the tire width direction;
a middle land portion that is a land portion adjacent to an outer side of the center land portion in the tire width direction comprising a middle sipe extending in the tire width direction;
the middle sipe being a composite sipe comprising a two-dimensional portion provided on an inner side in the tire width direction and a three-dimensional portion provided on an outer side of the two-dimensional portion in the tire width direction;
the three-dimensional portion having a sipe wall surface having a shape bent in a sipe width direction when viewed in a cross-sectional view perpendicular to the length direction of the sipe; and
the two-dimensional portion of the middle sipe being connected to the circumferential main groove of the inner side in the tire width direction of the middle land portion.

2. The pneumatic tire according to claim 1, wherein a ratio of a total length of the three-dimensional portions of the center sipe in the tire width direction to a length of the center sipe in the tire width direction is 0.30 or more and 0.70 or less.

3. The pneumatic tire according to claim 1, wherein the center sipe has a Z-shape with two bent portions.

4. The pneumatic tire according to claim 1, wherein a ratio of a length of the three-dimensional portion of the middle sipe in the tire width direction to a length of the middle land portion in the tire width direction is 0.25 or more and 0.80 or less.

5. The pneumatic tire according to claim 1, wherein
the middle sipe has a Z-shape with two bent portions, and
a ratio of a distance in the tire width direction between a bent portion that is a closer of the two bent portions to a center line, the center line passing through a midpoint position of the middle land portion in the tire width direction, and the center line to a width of the middle land portion in the tire width direction is 0 or more and 0.40 or less.

6. The pneumatic tire according to claim 1, wherein
an edge on an outer side of the middle land portion in the tire width direction is a zigzag edge having a zigzag shape with recesses/protrusions that has a position periodically changing in the tire width direction and an edge on an inner side of the middle land portion in the tire width direction has a straight shape, and
the three-dimensional portion of the middle sipe is connected to the zigzag edge.

7. The pneumatic tire according to claim 6, wherein the middle sipe is connected to a maximum amplitude position of the zigzag edge in the tire width direction.

8. The pneumatic tire according to claim 6, wherein a ratio of a minimum value of distances between protrusion portions of the zigzag shape to a maximum value of the distances between the protrusion portions of the zigzag shape is 0.50 or more.

9. The pneumatic tire according to claim 6, wherein the middle land portion comprises a plurality of lug grooves and, between the lug grooves that are adjacent, two or more of the middle sipes and three or more protrusion portions of the zigzag shape.

10. The pneumatic tire according to claim 9, wherein distances in a tire circumferential direction between connection portions of the two or more middle sipes with the circumferential main groove on the inner side in the tire width direction, the two or more middle sipes provided between the lug grooves that are adjacent, are Ls1, Ls2, . . . , Lsn, where n is a natural number of three or greater, and Ls1<Lsn.

11. The pneumatic tire according to claim 9, wherein
distances in a tire circumferential direction between connection portions of the two or more middle sipes with a circumferential main groove on the inner side in the tire width direction, the two or more middle sipes provided between the lug grooves that are adjacent, are Ls1, Ls2, . . . , Lsn, where n is a natural number of three or greater,
distances in the tire circumferential direction between the protrusion portions of connection portions of a plurality of the middle sipes with the circumferential main groove on an outer side in the tire width direction, the plurality of middle sipes provided between the lug grooves that are adjacent, are Lz1, Lz2, . . . , Lzn, where n is a natural number of three or greater, and
Ls1<Lz1 and Lsn>Lzn.

12. The pneumatic tire according to claim 1, further comprising a shoulder land portion that is a land portion on an outer side of the middle land portion in the tire width direction, wherein
the shoulder land portion comprises a shoulder sipe extending in the tire width direction,
the shoulder sipe is a composite sipe comprising a three-dimensional portion provided on the inner side in the tire width direction and a two-dimensional portion provided on an outer side of the three-dimensional portion in the tire width direction.

13. The pneumatic tire according to claim 12, wherein a ratio of a length of the three-dimensional portion of the shoulder sipe in the tire width direction to a ground contact width of the shoulder land portion in the tire width direction is 0.25 or more and 0.65 or less.

14. The pneumatic tire according to claim 12, wherein groove wall surfaces of both sides of the circumferential main groove between the middle land portion and the shoulder land portion are wall surfaces in which zigzag edges face each other.

15. A pneumatic tire, comprising:
a tread pattern comprising
two or more circumferential main grooves provided in a half region demarcated by a tire equatorial plane, and a plurality of land portions defined by the circumferential main grooves,
a center land portion that is a closest land portion of the plurality of land portions to the tire equatorial plane comprising a center sipe extending in a tire width direction;
the center sipe being a composite sipe comprising a two-dimensional portion and three-dimensional portions provided on both sides of the two-dimensional portion in the tire width direction;
a middle land portion that is a land portion adjacent to an outer side of the center land portion in the tire width direction comprising a middle sipe extending in the tire width direction and a plurality of lug grooves;
the middle sipe being a composite sipe comprising a two-dimensional portion provided on an inner side in the tire width direction and a three-dimensional portion provided on an outer side of the two-dimensional portion in the tire width direction; and
a raised bottom portion being provided in the lug grooves at an open end on an identical side to an end portion of the middle sipe at which the two-dimensional portion is provided.

* * * * *